United States Patent
Takazawa

(10) Patent No.: US 8,431,504 B2
(45) Date of Patent: Apr. 30, 2013

(54) OPTICAL GLASS, PRECISION PRESS-MOLDING PREFORM, OPTICAL ELEMENT AND THEIR PRODUCTION PROCESSES AS WELL AS IMAGE-SENSING DEVICE

(75) Inventor: Hiroki Takazawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 245 days.

(21) Appl. No.: 12/842,184

(22) Filed: Jul. 23, 2010

(65) Prior Publication Data
US 2011/0034315 A1 Feb. 10, 2011

(30) Foreign Application Priority Data

Jul. 29, 2009 (JP) ................................ 2009-176545
Jul. 14, 2010 (JP) ................................ 2010-159420

(51) Int. Cl.
*C03C 3/064* (2006.01)
*C03C 3/068* (2006.01)
*C03C 3/066* (2006.01)

(52) U.S. Cl.
USPC .......... 501/77; 501/78; 501/79; 65/64; 65/66; 65/102

(58) Field of Classification Search ............. 501/73, 501/77, 78, 79, 58; 65/64, 66, 102
See application file for complete search history.

(56) References Cited

U.S. PATENT DOCUMENTS

| | | | | |
|---|---|---|---|---|
| 4,734,389 A | * | 3/1988 | Grabowski et al. ........... | 501/73 |
| 7,491,667 B2 | * | 2/2009 | Hayashi ........................ | 501/51 |
| 2005/0026768 A1 | * | 2/2005 | Shimizu et al. ................ | 501/73 |
| 2008/0254966 A1 | | 10/2008 | Tomoe et al. | |
| 2009/0325779 A1 | * | 12/2009 | Negishi et al. ................ | 501/78 |

FOREIGN PATENT DOCUMENTS

| JP | 8-175841 | 7/1996 |
|---|---|---|
| JP | 2005-272194 | 10/2005 |
| JP | 2008-266028 | 11/2008 |

OTHER PUBLICATIONS

Machine Translation of JP 08-175841, Jul. 9, 1996.*

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

An optical glass that is an oxide glass and comprises, by cationic %, 20 to 40% of a total of $Si^{4+}$ and $B^{3+}$,
15 to 40% of a total of $Nb^{5+}$, $Ti^{4+}$, $W^{6+}$ and $Zr^{4+}$,
0.2 to 20% of a total of $Zn^{2+}$, $Ba^{2+}$, $Sr^{2+}$ and $Ca^{2+}$, and
15 to 55% of a total of $Li^+$, $Na^+$ and $K^+$,
the cationic ratio of the content of $B^{3+}$ to the total content of $B^{3+}$ and $Si^{4+}$ being 0.01-0.5,
the cationic ratio of the content of $Zr^{4+}$ to the total content of $Nb^{5+}$, $Ti^{4+}$, $W^{6+}$ and $Zr^{4+}$ being 0.05 or less,
the molar ratio of the total content of $Zn^{2+}$ and $Ba^{2+}$ to the total content of $Zn^{2+}$, $Ba^{2+}$, $Sr^{2+}$ and $Ca^{2+}$ being 0.8-1,
the optical glass having a refractive index nd of 1.815 or more and an Abbe's number vd of 29 or less.

25 Claims, 1 Drawing Sheet

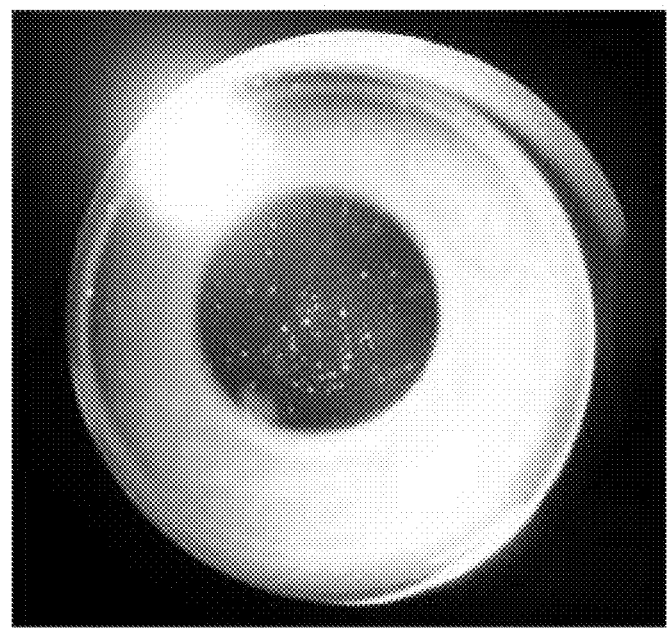
(a)
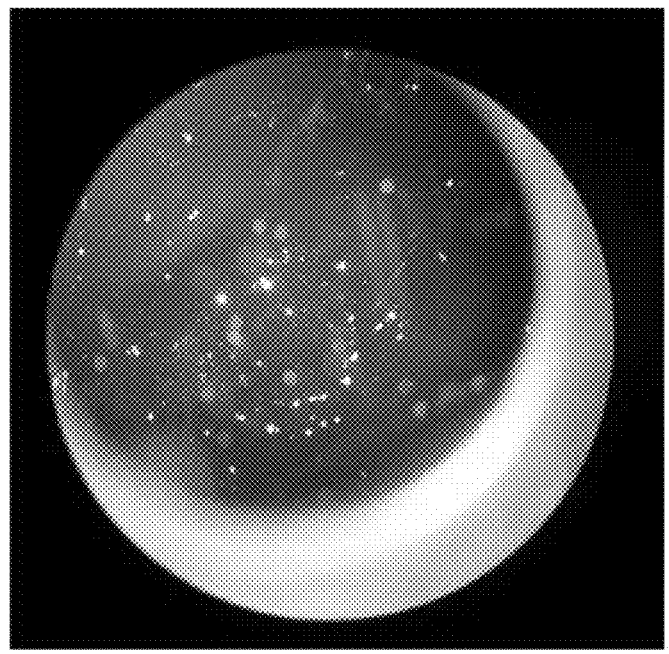
(b)

OPTICAL GLASS, PRECISION PRESS-MOLDING PREFORM, OPTICAL ELEMENT AND THEIR PRODUCTION PROCESSES AS WELL AS IMAGE-SENSING DEVICE

TECHNICAL FIELD

This invention relates to an optical glass having high-refractivity high-dispersion properties and having excellent precision press-moldability, a precision press-molding preform and an optical element formed of the above glass each, and processes for producing them, and it further relates to an image-sensing device having the above optical element mounted thereon.

BACKGROUND ART

A high-refractivity high-dispersion optical glass is highly demanded, and in particular, aspherical lenses formed of the above glass are indispensable as lenses for high-performance digital still cameras.

As a method for mass-producing aspherical lenses, there is known a precision press-molding method (which is also called "optical press molding method"). As a high-refractivity high-dispersion optical glass that is moldable by a precision press-molding method, a phosphate glass is known. While the phosphate optical glass is an excellent glass, it involves a problem that a glass surface is liable to be damaged during its precision press-molding.

As a non-phosphate glass having high-refractivity high-dispersion properties, glasses disclosed in Patent Documents 1 to 5 are known. All of these glasses have silica-containing compositions.

PRIOR ART DOCUMENTS

Patent Documents

Patent Document 1: International Publication No. 2004-110942
Patent Document 2: JP 2004-161598 A
Patent Document 3: JP 2002-87841 A

SUMMARY OF THE INVENTION

Problems to be Solved by the Invention

For obtaining a high-refractivity high-dispersion glass, it is required to introduce components that impart high-refractivity high-dispersion, such as Nb, Ti, etc., regardless of whether it is a phosphate-containing glass or silica-containing glass.

However, when a glass containing Nb, Ti, etc., is precision press-molded, a redox reaction takes place in an interface between the glass and a press mold. As a result, foaming takes place on the lens surface, and there is hence caused a problem that it is not easy to maintain production yields at high levels. The above problem becomes conspicuous when the press-molding temperature increases. A silica-containing glass has high glass transition temperature as compared with a phosphate glass, and it is required to set a press-molding temperature at high temperatures, which promotes the reaction between the glass and a press mold during precision press-molding.

For example, the glass disclosed in Patent Document 1 has a glass transition temperature of 530° C. or higher, and it is a glass transition temperature insufficient for inhibiting the above reaction. Further, the glass has low stability, and a crystal may be deposited while a glass melt is stirred for obtaining a homogeneous optical glass, or a crystal may be deposited when a glass melt is cast and molded, so that the above glass is unsuitable for mass-production.

The glass disclosed in Patent Document 2 has a problem that it has low stability like the glass in Patent Document 1 and is liable to be devitrified.

Patent Document 3 discloses a high-refractivity high-dispersion glass and an intermediate-refractivity high-dispersion glass. With regard to the high-refractivity high-dispersion glass, however, the glass transition temperature is not sufficiently decreased.

Under the circumstances, it is demanded to materialize a high-refractivity high-dispersion optical glass that resists devitrification and that enables the stable production of high-quality optical elements by precision press-molding.

It is an object of this invention to overcome the above problems and provide a high-refractivity high-dispersion optical glass excellent in devitrification resistance and precision press-moldability, a precision press-molding preform and an optical element formed of the above optical glass each, processes for producing them, and an image-sensing device having the above optical element.

Means to Solve the Problems

Means for solving the problems in this invention include:
[1] an optical glass that is an oxide glass and comprises, by cationic %,
  20 to 40% of a total of $Si^{4+}$ and $B^{3+}$,
  15 to 40% of a total of $Nb^{5+}$, $Ti^{4+}$, $W^{6+}$ and $Zr^{4+}$,
  0.2 to 20% of a total of $Zn^{2+}$, $Ba^{2+}$, $Sr^{2+}$ and $Ca^{2+}$, and
  15 to 55% of a total of $Li^+$, $Na^+$ and $K^+$,
  the cationic ratio of the content of $B^{3+}$ to the total content of $B^{3+}$ and $Si^{4+}$ being 0.01-0.5,
  the cationic ratio of the content of $Zr^{4+}$ to the total content of $Nb^{5+}$, $Ti^{4+}$, $W^{6+}$ and $Zr^{4+}$ being 0.05 or less,
  the molar ratio of the total content of $Zn^{2+}$ and $Ba^{2+}$ to the total content of $Zn^{2+}$, $Ba^{2+}$, $Sr^{2+}$ and $Ca^{2+}$ being 0.8-1,
  the optical glass having a refractive index nd of 1.815 or more and an Abbe's number vd of 29 or less,
[2] the optical glass of the above [1], which has a glass transition temperature of less than 530° C.,
[3] the optical glass of the above [1] or [2], which has a liquidus temperature of 1,080° C. or lower,
[4] the optical glass of any one of the above [1] to [3], wherein the cationic ratio of the content of $Nb^{5+}$ to the total content of $Nb^{5+}$ and $Ti^{4+}$, ($Nb^{5+}/(Nb^{5+}+Ti^{4+})$), is 0.65-1,
[5] the optical glass of any one of the above [1] to [4], which has an $Si^{4+}$ content of 15 to 30%,
[6] the optical glass of any one of the above [1] to [5], which has a $B^{3+}$ content of 15% or less,
[7] the optical glass of any one of the above [1] to [6], which has an $Nb^{5+}$ content of 10 to 30%,
[8] the optical glass of any one of the above [1] to [7], which has a $Ti^{4+}$ content of 0 to 15%,
[9] the optical glass of any one of the above [1] to [8], which has a $W^{6+}$ content of 0 to 4%,
[10] the optical glass of any one of the above [1] to [9], which has a $Zr^{4+}$ content of 0 to 4%,
[11] the optical glass of any one of the above [1] to [10], which has a $Zn^{2+}$ content of 9% or less,
[12] the optical glass of any one of the above [1] to [11], which has a $Ba^{2+}$ content of 6% or less,
[13] the optical glass of any one of the above [1] to [12], which has an $Sr^{2+}$ content of 2% or less,

[14] the optical glass of any one of the above [1] to [13], which has a $Ca^{2+}$ content of 3% or less,

[15] the optical glass of any one of the above [1] to [14], which has an $Li^+$ content of 25% or less,

[16] the optical glass of any one of the above [1] to [15], which has an $Na^+$ content of 30% or less,

[17] the optical glass of any one of the above [1] to [16], which has a $K^+$ content of 25% or less,

[18] the optical glass of any one of the above [1] to [17], wherein the cationic ratio of the content of $Li^+$ to the total content of $Li^+$, $Na^+$ and $K^+$ is 0.1-1.

[19] the optical glass of any one of the above [1] to [18], which has a $\Delta Pg,F$ of 0.0130 or less,

[20] a precision press-molding preform formed of the optical glass recited in any one of the above [1] to [19],

[21] a process for producing a precision press-molding preform, which comprises manufacturing the preform recited in the above [21] through the steps of heating and melting glass raw materials to prepare a molten glass and shaping said molten glass,

[22] an optical element formed of the optical glass recited in any one of the above [1] to [19],

[23] a process for producing an optical element, which comprises the steps of heating the precision press-molding preform recited in the above [20] and precision press-molding the preform with a press mold,

[24] a process for producing an optical element as recited in the above [23], wherein the precision press-molding preform and the press mold are heated together and the preform is precision press-molded,

[25] a process for producing an optical element as recited in the above [23], wherein the precision press-molding preform is heated and then introduced into the press mold that is pre-heated, and the preform is precision press-molded, and

[26] an image-sensing device having the optical element recited in the above [22].

Effect of the Invention

According to this invention, there can be provided a high-refractivity high-dispersion optical glass excellent in devitrification resistance and precision press-moldability, a precision press-molding preform and an optical glass formed of the above optical glass each, processes for producing them, and an image-sensing device having the above optical element.

BRIEF EXPLANATION OF THE DRAWINGS

FIG. 1 is a photograph of a lens obtained in Comparative Example 2.

EMBODIMENTS FOR PRACTICING THE INVENTION

Optical Glass

This invention provides a high-refractivity high-dispersion optical glass which employs a silica-containing composition thereby to prevent damage on a glass surface during precision press-molding, which maintains high refractivity and at the same time renders a glass transition temperature lower in order to prevent quality degradation caused on an optical element surface by an interfacial reaction between a component that imparts high-refractivity high-dispersion and the molding surface of a press mold, the quality degradation being a problem inherent to the precision press-molding of a high-refractivity high-dispersion optical glass, and which hence enables the stable production of high-quality optical elements by precision press-molding. Further, this invention also provides an optical glass that has excellent glass stability and can be produced easily in spite of its being a high-refractivity glass.

Further, there can be provided an optical glass material that maintains high-refractivity high-dispersion properties and at the same time has a partial dispersion ratio Pg,F controlled so that it is small, that is imparted with a property remarkably close to a normal line in a partial dispersion ratio Pg,F-Abbe's number vd chart and that is hence very effective for correcting chromatic aberration when combined with a lens formed of a low-dispersion glass. A silica-containing composition is also preferred for materializing the above partial dispersion property.

The optical glass of this invention completed on the basis of the above concept is an oxide glass and comprises, by cationic %, 20 to 40% of a total of $Si^{4+}$ and $B^{3+}$, 15 to 40% of a total of $Nb^{5+}$, $Ti^{4+}$, $W^{6+}$ and $Zr^{4+}$, 0.2 to 20% of a total of $Zn^{2+}$, $Ba^{2+}$, $Sr^{2+}$ and $Ca^{2+}$, and 15 to 55% of a total of $Li^+$, $Na^+$ and $K^+$, the cationic ratio of the content of $B^{3+}$ to the total content of $B^{3+}$ and $Si^{4+}$ being 0.01-0.5, the cationic ratio of the content of $Zr^{4+}$ to the total content of $Nb^{5+}$, $Ti^{4+}$, $W^{6+}$ and $Zr^{4+}$ being 0.05 or less, the molar ratio of the total content of $Zn^{2+}$ and $Ba^{2+}$ to the total content of $Zn^{2+}$, $Ba^{2+}$, $Sr^{2+}$ and $Ca^{2+}$ being 0.8-1, the optical glass having a refractive index nd of 1.815 or more and an Abbe's number vd of 29 or less.

The optical glass of this invention will be explained hereinafter, while contents and total contents of cationic components by % hereinafter stand for contents or total contents by cationic % unless otherwise specified.

$Si^{4+}$ and $B^{3+}$ are glass network-forming oxides and are essential for maintaining glass stability and moldability of a molten glass. When these components are incorporated to excess, however, the refractivity decreases. The total content of $Si^{4+}$ and $B^{3+}$ is hence limited to 20 to 40%. The total content of $Si^{4+}$ and $B^{3+}$ is preferably in the range of 25 to 35%, more preferably in the range of 25 to 34%, still more preferably 29 to 33%, yet more preferably in the range of 30 to 33%.

In addition to the above effects, $Si^{4+}$ not only has the effect of inhibiting phase separation during precision press-molding but also works to improve chemical durability and to inhibit a decrease in viscosity during the shaping of a molten glass to maintain the molten glass in a state suitable for shaping. When it is introduced to excess, however, the glass transition temperature and liquidus temperature increase, and the meltability and devitrification resistance decrease. When the above phase separation is inhibited, a decrease in transmissivity by whitening of the glass can be prevented.

In addition to the above effects, $B^{3+}$ not only improves meltability but also works to decrease glass transition temperature. When it is introduced to excess, chemical durability is decreased. Since meltability is improved, a homogeneous glass can be obtained without setting the glass-melting temperature at a high temperature. As a result, the corrosion of a crucible can be suppressed, and the coloring of a glass caused by the melting of a material such as platinum in the glass can be suppressed.

The above effects of $Si^{4+}$ and $B^{3+}$ are taken into account, and the cationic ratio ($B^{3+}/(B^{3+}+Si^{4+})$) of the content of $B^{3+}$ to the total content of $B^{3+}$ and $Si^{4+}$ is adjusted to 0.01-0.5. When the cationic ratio ($B^{3+}/(B^{3+}+Si^{4+})$) is adjusted to 0.01 or more, the glass transition temperature can be further decreased, so that there can be improved the effect of inhibiting an interfacial reaction between a glass and a press mold during precision press-molding, and meltability and devitrification resistance can be improved. When the cationic ratio ($B^{3+}/(B^{3+}+Si^{4+})$) is larger than 0.5, the viscosity when a molten glass is shaped decreases, so that the molten glass is deteriorated in shapeability, and tendency to phase separation during precision press-molding is increased, and chemical durability is decreased. The cationic ratio ($B^{3+}/(B^{3+}+Si^{4+})$) is preferably in the range of 0.05 to 0.5, more preferably in the range of 0.08 to 0.5, still more preferably in the range of 0.1 to 0.5, yet more preferably in the range of 0.1 to 0.45, further more preferably in the range of 0.1 to 0.4.

The content of $Si^{4+}$ is preferably in the range of 15 to 30%, more preferably in the range of 19 to 26%, still more preferably in the range of 19 to 25.5%. The content of $B^{3+}$ is preferably in the range of 15% or less, more preferably 0.3 to 15%, still more preferably in the range of 0.5 to 15%, yet more preferably in the range of 1 to 15%, further more preferably in the range of 3 to 15%, still further more preferably in the range of 6 to 12.3%, yet further more preferably in the range of 7 to 12%.

Any one of $Nb^{5+}$, $Ti^{4+}$, $W^{6+}$ and $Zr^{4+}$ is a component that has a big effect on the achievement of high refractivity and high dispersion. When the total content of these components is less than 15%, it is difficult to achieve the specified refractivity, and when it exceeds 40%, devitrification resistance decreases, and liquidus temperature increases. The total content of $Nb^{5+}$, $Ti^{4+}$, $W^{6+}$ and $Zr^{4+}$ is hence adjusted to 15 to 40%. The above total content is preferably in the range of 25 to 35%, more preferably in the range of 26 to 33%, still more preferably in the range of 28 to 31%, yet more preferably in the range of 28 to 30%.

In addition to the above effects, $Nb^{5+}$ works to improve devitrification resistance and to decrease liquidus temperature. Further, it works to bring the partial dispersion property close to a normal line, i.e., to bring $\Delta Pg,F$ close to zero. When it is incorporated to excess, the devitrification resistance is decreased, and the liquidus temperature is increased.

In addition to the above effects, $Ti^{4+}$ improves the devitrification resistance and works to improve the chemical durability. When it is incorporated to excess, however, the tendency to phase separation during precision press-molding is intensified.

In addition to the above effects, $W^{6+}$ improves devitrification resistance and works to inhibit an increase in liquidus temperature. When it is incorporated to excess, however, the devitrification resistance is degraded, and the liquidus temperature is increased. Further, the tendency to coloring is also intensified.

In addition to the above effects, $Zr^{4+}$ not only inhibits phase separation during precision press-molding, but also to works to improve chemical durability and devitrification resistance. When it is incorporated to excess, however, devitrification resistance is decreased, and liquidus temperature is increased. Since the incorporation of $Zr^{4+}$ to excess increases the glass transition temperature and promotes an interfacial reaction between a glass and a press mold during precision press-molding, the cationic ratio ($Zr^{4+}/(Nb^{5+}+Ti^{4+}+W^{6+}+Zr^{4+})$) of the content of $Zr^{4+}$ to the total content of $Nb^{5+}$, $Ti^{4+}$, $W^{6+}$ and $Zr^{4+}$ is limited to 0.05 or less. For obtaining the above effects of $Zr^{4+}$, the cationic ratio ($Zr^{4+}/(Nb^{5+}+Ti^{4+}+W^{6+}+Zr^{4+})$) is preferably in the range of 0.005 to 0.05, more preferably 0.008 to 0.03, still more preferably 0.009 to 0.025.

Of $Nb^{5+}$, $Ti^{4+}$, $W^{6+}$ and $Zr^{4+}$, $Nb^{5+}$ and $Ti^{4+}$ are components that do not deteriorate devitrification resistance even when they are introduced in a large amount, so that the total content of $Nb^{5+}$ and $Ti^{4+}$ is preferably in the range of 20 to 35%, more preferably in the range of 26 to 29.5%, still more preferably in the range of 26 to 28.5%. For further improving devitrification resistance, it is preferred to incorporate $Nb^{5+}$ and $Ti^{4+}$ as essential components.

Further, since $Nb^{5+}$ of $Nb^{5+}$ and $Ti^{4+}$ works greatly to keep the partial dispersion ratio low and to bring the partial dispersion property close to a normal line, the cationic ratio ($Nb^{5+}/(Nb^{5+}+Ti^{4+})$) of the content of $Nb^{5+}$ to the total content of $Nb^{5+}$ and $Ti^{4+}$ is preferably in the range of 0.65 to 1. Since, however, the devitrification resistance is improved when $Nb^{5+}$ and $Ti^{4+}$ are made co-present as glass components, the cationic ratio ($Nb^{5+}/(Nb^{5+}+Ti^{4+})$) is preferably in the range of 0.65 to 0.9, more preferably in the range of 0.7 to 0.8.

When the effects of each of $Nb^{5+}$, $Ti^{4+}$, $W^{6+}$ and $Zr^{4+}$ are taken into account, the preferred range of the content of each component is as follows.

The upper limit of the content of $Nb^{5+}$ is preferably 30%, more preferably 23%, still more preferably 22%, yet more preferably 21%, and the lower limit of the content of $Nb^{5+}$ is preferably 10%, more preferably 16%, still more preferably 18%, yet more preferably 19%. The above preferred upper limits and lower limits may be combined as required. Specifically, the content of $Nb^{5+}$ is, for example, preferably in the range of 10 to 30%, more preferably in the range of 16 to 23%, still more preferably in the range of 18 to 22%, yet more preferably in the range of 19 to 21%.

The upper limit of the content of $Ti^{4+}$ is preferably 15%, more preferably 12%, still more preferably 10%, yet more preferably 9.5%, further more preferably 9%, still further more preferably 8.5%, yet further more preferably 8.0%, and the lower limit of the content of $Ti^{4+}$ is preferably 1%, more preferably 2%, still more preferably 3%, yet more preferably 4%, further more preferably 5%, still further more preferably 5.5%. The above preferred upper limits and lower limits may be combined as required. Specifically, the content of $Ti^{4+}$ is, for example, preferably in the range of 0 to 15%, more preferably in the range of 0 to 12%, still more preferably 0 to 10%, yet more preferably in the range of 1 to 10%, further more preferably in the range of 2 to 10%, still further more preferably in the range of 3 to 9%, yet further more preferably 4 to 9%, further far more preferably in the range of 5 to 8.5%, particularly preferably in the range of 5.5 to 8.0%.

The upper limit of the content of $W^{6+}$ is preferably 4%, more preferably 3%, still more preferably 2.5%, yet more preferably 2.0%, further more preferably 1.5%, and the lower limit of the content of $W^{6+}$ is preferably 0.5%. The above preferred upper limits and lower limit may be combined as required. Specifically, the content of $W^{6+}$ is, for example, preferably in the range of 0 to 3%, more preferably in the range of 0 to 2.5%, still more preferably in the range of 0.5 to 2.0%, yet more preferably in the range of 0.5 to 1.5%.

The upper limit of the content of $Zr^{4+}$ is preferably 4%, more preferably 3%, still more preferably 2%, yet more preferably 1.5%, further more preferably 1.2%, still further more preferably 1%, yet further more preferably 0.6%, and the lower limit of the content of $Zr^{4+}$ is preferably 0.2%, more preferably 0.5%. The above preferred upper limits and lower limits may be combined as required. Specifically, the content of $Zr^{4+}$ is, for example, preferably in the range of 0 to 4%, more preferably in the range of 0 to 3%, still more preferably 0 to 2%, yet more preferably in the range of 0 to 1.5%, further more preferably in the range of 0.1 to 1.5%, still further more preferably in the range of 0.2 to 1.2%, yet further more preferably in the range of 0.2 to 1%, further far more preferably in the range of 0.4 to 0.6%.

$Zn^{2+}$, $Ba^{2+}$, $Sr^{2+}$ and $Ca^{2+}$ are useful for adjusting optical constants, and they are components that improve devitrification resistance, meltability and light transmissivity and that enhance a clarification effect when they are added to glass raw materials in the form of carbonates and nitrates. When the total content of $Zn^{2+}$, $Ba^{2+}$, $Sr^{2+}$ and $Ca^{2+}$ is less than 0.5%, it is difficult to produce the above effects, and when it exceeds 20%, devitrification resistance is decreased, liquidus temperature is increased and chemical durability is decreased. The total content of $Zn^{2+}$, $Ba^{2+}$, $Sr^{2+}$ and $Ca^{2+}$ is therefore limited to 0.2 to 20%. The upper limit of the total content of $Zn^{2+}$, $Ba^{2+}$, $Sr^{2+}$ and $Ca^{2+}$ is preferably 15%, more preferably 10%, still more preferably 8.5%, and the lower limit of the total content of $Zn^{2+}$, $Ba^{2+}$, $Sr^{2+}$ and $Ca^{2+}$ is preferably 0.3%, more preferably 0.4%, still more preferably 0.5%, yet more preferably 1%, further more preferably 3%, further far more preferably 5%, further still far more preferably 6.5%, further yet far more preferably 7%. The above preferred upper limits and lower limits may be combined as required. Specifically, the total content of $Zn^{2+}$, $Ba^{2+}$, $Sr^{2+}$ and $Ca^{2+}$ is preferably in the range of 1 to 20%, more preferably in the range of 3 to 20%, still more preferably in the range of 3 to 15%, yet more preferably in the range of 5 to 10%, further more preferably in the range of 6.5 to 10%, further far more preferably in the range of 7 to 8.5%.

In addition to the above effects, $Zn^{2+}$ is excellent in work to decrease glass transition temperature, and also works to maintain refractivity at high levels. When it is incorporated to excess, however, devitrification resistance is decreased, liquidus temperature is increased, and chemical durability tends to be decreased.

In addition to the above effects, $Ba^{2+}$ increases refractivity and works to inhibit phase separation during precision press-molding. When it is incorporated to excess, however, devitrification resistance is decreased, liquidus temperature is increased, and chemical durability tends to be decreased.

In addition to the above effects, $Sr^{2+}$ works to increase refractivity although its effect is lower than that of $Ba^{2+}$. Further, it works to inhibit phase separation during precision press-molding. When it is incorporated to excess, however, devitrification resistance is decreased, liquidus temperature is increased, and chemical durability tends to be decreased.

In addition to the above effects, $Ca^{2+}$ works to inhibit phase separation during precision press-molding. When it is incorporated to excess, however, devitrification resistance is decreased, liquidus temperature is increased, glass transition temperature is increased, and chemical durability tends to be decreased.

Of $Zn^{2+}$, $Ba^{2+}$, $Sr^{2+}$ and $Ca^{2+}$, $Zn^{2+}$ is a component that maintains high refractivity and at the same time highly effectively decreases glass transition temperature, and $Ba^{2+}$ is a component that greatly works to increase refractivity, so that the cationic ratio $((Zn^{2+}+Ba^{2+})/(Zn^{2+}+Ba^{2+}+Sr^{2+}+Ca^{2+}))$ of the total content of $Zn^{2+}$ and $Ba^{2+}$ to the total content of $Zn^{2+}$, $Ba^{2+}$, $Sr^{2+}$ and $Ca^{2+}$ is adjusted to 0.8-1 for satisfying both high refractivity and low glass transition temperature.

The cationic ratio $((Zn^{2+}+Ba^{2+})/(Zn^{2+}+Ba^{2+}+Sr^{2+}+Ca^{2+}))$ is preferably in the range of 0.82 to 1, more preferably in the range of 0.85 to 1, still more preferably in the range of 0.9 to 1.

When the effects of each of $Zn^{2+}$, $Ba^2$, $Sr^{2+}$ and $Ca^{2+}$ are taken into account, the preferred range of the content of each component is as follows.

The content of $Zn^{2+}$ is preferably in the range of 9% or less, more preferably in the range of 1 to 9%, still more preferably in the range of 3 to 9%, yet more preferably in the range of 3 to 8%, further more preferably in the range of 4.5 to 6.5%, still further more preferably in the range of 5.6 to 6.0%, the content of $Ba^{2+}$ is preferably in the range of 6% or less, more preferably in the range of 0.5 to 6%, still more preferably in the range of 0.5 to 4%, yet more preferably in the range of 0.8 to 3%, further more preferably in the range of 1.0 to 2.0%, the content of $Sr^{2+}$ is preferably in the range of 0 to 2%, more preferably in the range of 0 to 1.5%, still more preferably in the range of 0 to 1%, and the content of $Ca^{2+}$ is preferably in the range of 0 to 3%, more preferably in the range of 0 to 2%, still more preferably in the range of 0 to 1.5%, yet more preferably in the range of 0.1 to 0.9%, further more preferably in the range of 0.32 to 0.45%.

$Li^+$, $Na^+$ and $K^+$ are components that improve meltability and have the effect of decreasing glass transition temperature. When the total content of these components is less than 15%, it is difficult to produce the above effect, and when it exceeds 55%, glass stability is decreased, and liquidus temperature is increased. The total content of $Li^+$, $Na^+$ and $K^+$ is hence limited to 15 to 55%. The total content of $Li^+$, $Na^+$ and $K^+$ is preferably in the range of 20 to 50%, more preferably in the range of 25 to 40%, still more preferably in the range of 28 to 40%, yet more preferably in the range of 30 to 35%.

$Li^+$ is a component that has the largest effect of decreasing glass transition temperature with maintaining high refractivity among the alkali metal components. When it is incorporated to excess, however, glass stability is decreased, and liquidus temperature is increased.

In addition to the above effects, when $Na^+$ and $K^+$ are made co-present with $Li^+$, they work to increase glass stability further due to a mixing alkali effect.

For satisfying both high refractivity and low glass transition temperature, the cationic ratio $(Li^+/(Li^++Na^++K^+))$ of the total content of $Li^+$ to the total content of $Li^+$, $Na^+$ and $K^+$ in this invention is preferably adjusted to 0.1-1. From the above point of view, the cationic ratio $(Li^+/(Li^++Na^++K^+))$ is preferably in the range of 0.2 to 1, more preferably in the range of 0.3 to 0.8, still more preferably in the range of 0.4 to 0.5.

When the effects of each of $Li^+$, $Na^+$ and $K^+$ are taken into account, the preferred range of the content of each component is as follows.

The content of $Li^+$ is preferably in the range of 25% or less, more preferably in the range of 10 to 20%, still more preferably in the range of 13 to 17%, yet more preferably in the range of 14 to 16%, the content of $Na^+$ is preferably in the range of 30% or less, more preferably in the range of 10 to 20%, still more preferably in the range of 13 to 17%, yet more preferably in the range of 14 to 16%, and the content of $K^+$ is preferably in the range of 0 to 25%, more preferably in the range of 0 to 20%, still more preferably in the range of 0 to 15%, yet more preferably in the range of 0 to 9%, further more preferably in the range of 0 to 5%, still further more preferably in the range of 2 to 4%.

$La^{3+}$, $Gd^{3+}$, $Y^{3+}$ and $Yb^{3+}$ work to increase refractivity and to improve chemical durability. When each is incorporated in an amount of over 6%, liquidus temperature is increased, and devitrification resistance is decreased. The content of each of $La^{3+}$, $Gd^{3+}$, $Y^{3+}$ and $Yb^{3+}$ is limited to 0 to 6%. The content of each of $La^{3+}$, $Gd^{3+}$, $Y^{3+}$ and $Yb^{3+}$ is preferably in the range of 0 to 3%, more preferably in the range of 0 to 2%, still more preferably in the range of 0 to 1%, and yet more preferably, none of $La^{3+}$, $Gd^{3+}$, $Y^3$ and $Yb^{3+}$ is incorporated.

$Ta^{5+}$ also works to increase refractivity and to improve chemical durability. When it is introduced in an amount of over 3%, however, liquidus temperature is increased, and devitrification resistance is decreased. The content of $Ta^{5+}$ is hence limited to 0 to 3%. The content of $Ta^{5+}$ is preferably in the range of 0 to 2%, more preferably in the range of 0 to 1%.

$Ge^{4+}$ is a network-forming oxide and works to increase refractivity. Since, however, it is a very expensive component, the content of $Ge^{4+}$ is limited to 0 to 2%, and it is preferably limited to 0 to 1%. And, more preferably, no $Ge^{4+}$ is introduced.

$Bi^{3+}$ increases refractivity and also works to improve glass stability. When it is introduced in an amount of over 2%, however, the coloring of a glass is intensified, so that the content of $Bi^{3+}$ is 0 to 2%, preferably 0 to 1%, still more preferably zero.

$Al^{3+}$ works to improve glass stability and chemical durability when introduced in a small amount. When it is introduced in an amount of over 1%, liquidus temperature is increased, and devitrification resistance is decreased. The content of $Al^{3+}$ is 0 to 1%, preferably 0 to 0.5%, more preferably 0 to 0.2%, still more preferably zero.

The glass of this invention is not required to contain any component of $Ga^{3+}$, $Lu^{3+}$ and $Hf^{4+}$. Since $Ga^{3+}$, $Lu^{3+}$ and $Hf^{4+}$ are also expensive components, the content of each of $Ga^{3+}$, $Lu^{3+}$ and $Hf^{4+}$ is preferably limited to 0 to 1%, it is more preferably limited to 0 to 0.5%, and it is still more preferably limited to 0 to 0.1%. And, it is particularly preferred to introduce none of $Ga^{3+}$, $Lu^{3+}$ and $Hf^{4+}$.

When adverse effects on the environment are taken into account, it is also preferred to introduce none of As, Pb, U, Th, Te and Cd.

For making the most of excellent light transmissivity of the glass, none of coloring-causing substances such as Cu, Cr, V, Fe, Ni, Co, etc., is introduced. That is, it is preferred to use none of these substances as any glass raw material when the glass is produced. For achieving the object of this invention, the total content of $Si^{4+}$, $B^{3+}$, $Nb^{5+}$, $Ti^{4+}$, $W^{6+}$, $Zr^{4+}$, $Zn^{2+}$, $Ba^{2+}$, $Sr^{2+}$, $Ca^{2+}$, $Li^+$, $Na^+$ and $K^+$ is preferably 95 to 100%, more preferably 98 to 100%, still more preferably 99 to 100%.

To the optical glass of this invention, there can be added externally 0 to 2 mass % of $Sb_2O_2$ and 0 to 2 mass % of $SnO_2$. These additives work as a clarifier, and $Sb_2O_2$ can also inhibit impurities such as Fe, etc., from coloring the glass. The amount of each of $Sb_2O_2$ and $SnO_2$ externally added is preferably 0 to 1 mass %, more preferably 0 to 0.5 mass %.

The optical glass of this invention is an oxide glass, and $O^{2-}$ accounts for 50% or more of anionic components. Besides this, a small amount of $F^-$, $Cl^-$, $I^-$ and $Br^-$ may be introduced. The content of $O^{2-}$ is preferably in the range of 50 to 100 anionic %, more preferably in the range of 80 to 100 anionic %, still more preferably 85 to 100 anionic %, yet more preferably 90 to 100 anionic %, further more preferably 95 to 100 anionic %, still further more preferably 98 to 100 anionic %, yet further more preferably 99 to 100 anionic %, particularly preferably 100 anionic %.

Refractive Index, Abbe's Number

The optical glass of this invention has a refractive index nd of 1.83 or more and an Abbe's number vd of 29 or less. When the refractive index nd is in the above range, there can be obtained an optical glass suitable as a material for an optical element that constitutes a high-function and compact optical system. When a high-refractivity glass is used, the curvature of a lens surface can be moderated when a lens having constant condensing power is produced. As a result, the shapeability of a lens during precision press-molding can be also improved.

When the Abbe's number vd is in the above range, there can be obtained an optical glass suitable as a material for a lens that permits excellent correction of chromatic aberration by using the lens in combination with a lens formed of a low-dispersion glass.

The refractive index nd is preferably in the range of 1.83 to 1.90, more preferably in the range of 1.83 to 1.88, still more preferably in the range of 1.84 to 1.855, and the Abbe's number vd is preferably in the range of 23 to 29, more preferably in the range of 24 to 25.5, still more preferably in the range of 24.5 to 25.25.

When the refractive index is increased to excess, or when the Abbe's number vd is decreased to excess, the glass stability decreases, or the glass transition temperature tends to increase.

Glass Transition Temperature

The glass transition temperature of the optical glass of this invention is lower than 530° C., preferably 520° C. or lower, more preferably 515° C. or lower, still more preferably 510° C. or lower. As the glass transition temperature decreases, the press-molding temperature can be set at lower temperatures. The proceeding speed of the interfacial reaction between a glass and a press mold during precision press-molding is greatly influenced depending upon whether the press-molding temperature is high or low. Therefore, when the glass transition temperature can be decreased by only several ° C. or tens ° C., the interfacial reaction can be remarkably inhibited.

Generally, when the refractive index is increased, the glass transition temperature tends to increase. According to this invention, however, there can be obtained a glass having a low glass transition temperature suitable for precision press-molding in spite of being a high-refractivity glass.

Liquidus Temperature

The liquidus temperature of the optical glass of this invention is 1,080° C. or lower, preferably 1,060° C. or lower, more preferably 1,020° C. or lower, still more preferably 1,015° C. or lower.

When the above liquidus temperature is maintained at a low level, the temperature for shaping a molten glass can be decreased. When the temperature for the above shaping is maintained at a low level, the volatilization of easily volatile components such as boric acid, an alkali metal, etc., from a molten glass surface can be inhibited, and the variance of optical properties and the occurrence of surface striae can be inhibited.

Generally, when the refractivity is increased, the liquidus temperature tends to increase. According to this invention, however, there can be obtained a glass having a low liquidus temperature excellent for mass-producibility in spite of being a high-refractivity glass.

Generally, it is said to be difficult to achieve higher refractivity, a lower glass transition temperature and a lower liquidus temperature at the same time, while these properties can be simultaneously materialized according to this invention.

Partial Dispersion Property

For achromatization of high order in an image-sensing optical system, a projector optical system, etc., it is effective to use a lens formed of a low-dispersion glass and a lens formed of a high-dispersion glass in combination. Since, however, many glasses on the lower dispersion side have large partial dispersion ratios, it is more effective for correcting chromatic aberration of high order to combine a lens formed of a glass having a small partial dispersion ratio in addition of a high dispersion property.

According to this invention, there is provided a glass that is a high-refractivity high-dispersion glass, that has a small partial dispersion ratio and that is hence suitable for correcting chromatic aberration of high order.

A partial dispersion ratio Pg,F is represented by (ng-nF)/(nF-nc) in which ng, nF and nc are refractive indexes to g ray, F ray and c ray.

In a partial dispersion ratio Pg,F-Abbe's number vd chart, when a partial dispersion ratio on a normal line as a reference for a normal partial dispersion glass is taken as $Pg,F^{(0)}$, $Pg,F^{(0)}$ is represented by the following expression using an Abbe's number vd.

$$Pg,F^{(0)} = 0.6483 - (0.0018 \times vd)$$

ΔPg,F is a deviation of the partial dispersion ratio Pg,F from the above normal line, and is represented by the following expression.

$$\Delta P_{g,F} = P_{g,F} - P_{g,F}^{(0)}$$
$$= P_{g,F} + (0.0018 \times vd) - 0.6483$$

In the optical glass of this invention, the deviation ΔPg,F of the partial dispersion ratio Pg,F is 0.014 or less, preferably 0.013 or less, more preferably 0.012 or less, and the optical glass of this invention is a glass suitable for well correcting chromatic aberration of high order. The partial dispersion ratio Pg,F of the optical glass of this invention is 0.610 to 0.620, preferably 0.611 to 0.618.

Production of Optical Glass

The optical glass of this invention can be obtained by weighing and formulating oxides, carbonates, sulfates, nitrates, hydroxides, etc., as raw materials so as to obtain an intended glass composition, fully mixing them to obtain a mixture batch, and heating, melting, defoaming and stirring the batch in a melting vessel to prepare a homogenous bubble-free molten glass and shaping it. Specifically, it can be produced by a known melting method.

Precision Press-Molding Preform

The precision press-molding preform of this invention will be explained below.

The precision press-molding preform of this invention is characteristically formed of the above optical glass of this invention.

The above precision press-molding preform (to be referred to as "preform" hereinafter) refers to a glass gob that is used for precision press-molding and is a glass shaped material having a mass equivalent to the mass of a precision press-molded product.

The preform will be explained in detail below.

The preform means a pre-shaped glass material that is heated and used for precision press-molding. As is well known, the precision press-molding is also called optics molding and is a method in which the optical function surface of an optical element is formed by transferring the form of the molding surface of a press mold. The optical function surface refers to that surface of an optical element which refracts, reflects or diffracts light to be controlled or makes the light enter or go out, and a lens surface of a lens, etc., correspond to the optical function surface.

For preventing a reaction and fusion between a glass and the molding surface of a press mold during precision press-molding and at the same time making the extension of the glass good along the molding surface, it is preferred to coat the preform surface with a release film. The release film includes noble metals (platinum, platinum alloy),
oxides (oxides of Si, Al, Zr, La, Y, etc.),
nitrates (nitrates of B, Si, Al, etc.), and
a carbon-containing film.

The carbon-containing film is desirably a film composed mainly of carbon (a film having a greater content of carbon than the total content of other elements when the contents of elements in the film are shown by atomic %). Specific examples thereof include a carbon film, a hydrocarbon film, etc. As a method for forming a carbon-containing film, there can be employed known methods such as a vacuum vapor deposition method, a spurring method, an ion plating method, etc., that use carbon materials, or a known method such as thermal decomposition using a material gas such as a hydrocarbon. The other films can be formed by a vapor deposition method, a sputtering method, an ion plating method, a sol-gel method, etc.

The preform is produced through the steps of heating and melting glass raw materials to prepare a molten glass and shaping the molten glass.

The first embodiment of producing a preform is a method in which a molten glass gob having a predetermined weight is separated from the molten glass and cooled to form a preform having a weight equivalent to the above molten glass gob. For example, glass raw materials are melted, clarified and homogenized to prepare a homogeneous molten glass, and the molten glass is caused to flow out of a temperature-controlled outflow nozzle made of platinum or platinum alloy. When a preform of a small size or a spherical preform is shaped, the molten glass is caused to drop from the outflow nozzle in the form of a molten glass drop having a desired mass, received with a preform shaping die and shaped into the preform. Alternatively, a molten glass drop having a desired mass is similarly caused to drop in liquid nitrogen from the outflow nozzle, and then shaped into the preform. When a preform of a middle or large size is produced, the molten glass flow is caused to flow down from the outflow pipe, the forward end of the molten glass flow is received with a preform shaping die, a narrow portion is formed between the molten glass flow nozzle and the preform shaping die, the preform shaping die is moved vertically downward to separate a molten glass flow at the narrow portion owing to the surface tension of the molten glass, and a molten glass gob having a desired mass is received in a receiving member and shaped into the preform.

For producing a preform having a smooth surface free of flaws, soiling, creases, alteration, etc., e.g., a preform having a free surface, there may be employed a method in which a molten glass gob is shaped into a preform while causing the molten glass gob to float on/over a preform shaping die by applying gas pressure, or a method in which the molten glass gob is placed in a medium prepared by cooling a substance that is a gas at room temperature under atmospheric pressure such as liquid nitrogen to shape it into a preform.

When a molten glass gob is shaped into a preform while causing it to float, a gas (called a floating gas) is blown to the molten glass gob, and an upward gas pressure is applied thereto. In this case, when the viscosity of the molten glass mass is too low, floating gas enters the glass to form bubbles that remains in the preform. However, when the viscosity of the molten glass gob is adjusted to 3 to 60 dPa·s, the glass gob can be caused to float without any floating gas included in the glass.

The gas to be used for blowing the floating gas to the preform includes air, $N_2$ gas, $O_2$ gas, Ar gas, He gas, steam, etc. The gas pressure is not specially limited so long as the preform can be caused to flow without contacting solids such as the surface of the shaping die, etc.

Many precision press-molded products (e.g., optical elements) produced through performs have an axis of rotational symmetry like a lens, so that the form of the preform is also preferably a form having an axis of rotational symmetry. Specifically, the above form is a sphere or a form having one axis of rotational symmetry. The form having one axis of rotational symmetry includes a form having a smooth frame free of a corner or a dent in its cross section including the above axis of rotational symmetry, such as a form having a frame formed of an ellipse of which the minor axis corresponds to the axis of rotational symmetry in the above cross section, a form obtained by flattening a sphere (a form obtained by selecting one axis passing the center of a sphere and pushing down the sphere in the direction of the selected axis), a form in which two points of intersection of a surface and the axis of symmetry exist, a surface including one point of intersection is a concave surface and a surface including the other point of intersection is a convex surface, a form in which both the surfaces including the above two points of intersection are concave surfaces, etc.

The second embodiment of producing a preform is a method in which a homogeneous molten glass is cast into a casting mold to be shaped, strain is removed from the shaped material by annealing, the shaped material is cut or split to divide it into pieces having predetermined dimensions and form to prepare a plurality of glass pieces, and the glass pieces are polished to smooth surfaces and to obtain performs of a glass having a predetermined mass each. The thus-produced preform is preferably surface-coated with a carbon-containing film before it is used.

Optical Element

The optical element of this invention will be explained below. The optical element of this invention is characteristically formed of the above optical glass of this invention. Specific examples thereof include lenses such as an aspherical lens, a spherical lens, a plano-concave lens, a plano-convex lens, a biconcave lens, a biconvex lens, a convex meniscus lens, a concave meniscus lens, etc., a micro lens, a lens array, a lens with a diffraction grating, a prism, a prism with a lens function, etc. The optical element may be provided with an anti-reflection film, a partial anti-reflection film capable of wavelength selection, etc., on its surface as required.

The optical element of this invention is formed of the glass having a high-dispersion property but having a small partial dispersion ratio, so that it can perform chromatic aberration of high order by combining it with an optical element formed of other glass. Further, the optical element of this invention is formed of the glass having high refractivity, so that it can serve to downsize an optical system when used in an image-sensing optical system, a projector optical system, etc.

Process for Producing Optical Element

The process for producing an optical element, provided by this invention, will be explained below.

The process for producing an optical element, provided by this invention, comprises the steps of heating the above precision press-molding preform of this invention and precision press-molding it with a press mold.

The steps of heating a press mold and a preform and pressing the preform are preferably carried out in a non-oxidizing gas atmosphere of nitrogen gas or a gas mixture of nitrogen gas with hydrogen gas in order to prevent the oxidation of the molding surface of the press mold or a release film formed on the above molding surface. In a non-oxidizing gas atmosphere, a carbon-containing film coated on the preform surface is not oxidized, and the above film remains on the surface of a molded product obtained by precision press-molding. The above film is to be finally removed, and for relatively easily and completely removing the carbon-containing film, the precision press-molded product can be heated in an oxidizing atmosphere, e.g., in air. The carbon-containing film is to be oxidation-removed at a temperature at which the precision press-molded product is not deformed by heating. Specifically, the oxidation removal is preferably carried out in a temperature range of lower than the transition temperature of the glass.

The precision press-molding uses a press mold having a molding surface that is highly accurately processed beforehand in a desired form, and a release film may be formed on the molding surface for preventing the fusion of a glass during pressing. The release film includes a carbon-containing film, a nitride film and a noble metal film, and the carbon-containing film preferably includes a hydrogenated carbon film, a carbon film, etc. In the precision press-molding, a preform is fed into between a pair of an upper mold member and a lower mold member of which the molding surfaces are accurately form-processed, both the mold and the preform are heated up to a temperature corresponding to a glass viscosity of $10^5$ to $10^9$ dPa·s, to soften the preform, and the preform is press-molded to transfer the forms of the molding surfaces of the mold to the glass.

Further, a preform that is temperature-increased to a temperature corresponding to a glass viscosity of $10^4$ to $10^8$ dPa·s is fed into between a pair of an upper mold member and a lower mold member of which the molding surfaces are accurately form-processed, and the preform is press-molded, whereby the forms of the molding surfaces of a mold can be accurately transferred to a glass.

The pressure and time period for the pressing can be determined as required by taking account of the viscosity of a glass, etc. For example, the pressure for the pressing can be set at approximately 5 to 15 MPa, and the pressing time period can be 10 to 300 seconds. The pressing conditions such as the pressing time period, the pressing pressure, etc., can be determined depending upon the form and dimensions of a molded product as required so far as they are known.

Then, the mold and the precision press-molded product are cooled, and preferably, when a temperature of a strain point or lower is reached, the precision press-molded product is separated from the mold and taken out. In addition, for accurately bringing the optical properties into agreement with desired values, annealing conditions of the molded product during cooling, e.g., an annealing speed, etc., may be adjusted as required.

The above process for producing an optical element is largely classified into two methods. The first method is a method of producing an optical element in which a preform is introduced into a press mold and the press mold and the glass material (preform) are heated together, and this method is recommendable when a high priority is put on improvements of molding accuracy such as surface accuracy, decentering accuracy, etc. The second method is a method of producing an optical element in which a preform is heated and introduced into a pre-heated press mold to carry out precision press-molding, and this method is recommendable when a high priority is placed on the improvement of productivity.

The optical element of this invention can be also produced without a press-molding step. For example, it can be obtained by casting a homogeneous molten glass into a casting mold to form a glass block, annealing the glass block to remove a strain, concurrently adjusting optical properties by adjusting annealing conditions so as to obtain a desired value of refractivity of the glass, then, cutting or splitting the glass block to prepare a glass piece and grinding and polishing the glass piece to complete it into the optical element.

Examples

This invention will be explained further in detail with reference to Examples, while this invention shall not be limited by these Examples.

Example 1

Corresponding oxides, carbonates, sulfates, nitrates, hydroxides were used as raw materials for introducing components that would give glass compositions shown in Tables 1 to 7. The raw materials were weighed and fully mixed to prepare a formulated raw material, and it was placed in a platinum crucible, heated and melted. After melted, a molten glass was cast into a casting mold, and it was gradually cooled to a temperature around its glass transition temperature and was placed in an annealing furnace immediately thereafter to carry out annealing treatment in the range of transition temperature of the glass for about 1 hour. Then, the glass was allowed to cool in the furnace until its temperature reached room temperature. In this manner, optical glasses of glasses Nos. 1 to 47 were obtained.

In the thus-obtained optical glasses, no crystal observable through a microscope was deposited.

Tables 1 to 7 show various properties of the above-obtained optical glasses.

TABLE 1

| | | No. | | | | | | |
|---|---|---|---|---|---|---|---|---|
| | | 1 | 2 | 3 | 4 | 5 | 6 | 7 |
| Cationic component (cationic %) | $Si^{4+}$ | 23.36 | 23.86 | 23.36 | 23.86 | 23.39 | 23.39 | 23.39 |
| | $B^{3+}$ | 6.95 | 6.46 | 6.96 | 6.46 | 6.97 | 6.97 | 6.47 |
| | $Nb^{5+}$ | 19.88 | 19.87 | 19.89 | 19.89 | 19.91 | 19.91 | 19.91 |
| | $Ti^{4+}$ | 7.95 | 7.95 | 7.96 | 7.96 | 7.96 | 7.96 | 7.96 |
| | $W^{6+}$ | 0.99 | 0.99 | 0.99 | 0.99 | 1.00 | 1.00 | 1.00 |
| | $Zr^{4+}$ | 0.65 | 0.65 | 0.55 | 0.55 | 0.45 | 0.45 | 0.45 |
| | $Zn^{2+}$ | 5.46 | 5.46 | 5.47 | 5.47 | 5.48 | 5.48 | 5.48 |
| | $Ba^{2+}$ | 2.48 | 2.48 | 2.49 | 2.49 | 2.49 | 2.09 | 2.09 |
| | $Sr^{2+}$ | 0.00 | 0.00 | 0.00 | 0.00 | 0.00 | 0.00 | 0.00 |
| | $Ca^{2+}$ | 0.20 | 0.20 | 0.20 | 0.20 | 0.20 | 0.60 | 0.60 |
| | $Li^+$ | 14.90 | 14.90 | 14.92 | 14.92 | 14.93 | 14.93 | 15.43 |
| | $Na^+$ | 13.21 | 13.21 | 13.23 | 13.23 | 13.24 | 13.24 | 13.24 |
| | $K^+$ | 3.97 | 3.97 | 3.98 | 3.98 | 3.98 | 3.98 | 3.98 |
| | Total | 100.00 | 100.00 | 100.00 | 100.00 | 100.00 | 100.00 | 100.00 |
| | $Si^{4+} + B^{3+}$ | 30.31 | 30.32 | 30.32 | 30.32 | 30.36 | 30.36 | 29.86 |
| | $B^{3+}/(B^{3+} + Si^{4+})$ | 0.2293 | 0.2131 | 0.2296 | 0.2131 | 0.2296 | 0.2296 | 0.2167 |
| | $Nb^{5+} + Ti^{4+} + W^{6+} + Zr^{4+}$ | 29.47 | 29.46 | 29.39 | 29.39 | 29.32 | 29.32 | 29.32 |
| | $Zr^{4+}/(Nb^{5+} + Ti^{4+} + W^{6+} + Zr^{4+})$ | 0.0221 | 0.0221 | 0.0187 | 0.0187 | 0.0153 | 0.0153 | 0.0153 |
| | $Nb^{5+} + Ti^{4+}$ | 27.83 | 27.82 | 27.85 | 27.85 | 27.87 | 27.87 | 27.87 |
| | $Nb^{5+}/(Nb^{5+} + Ti^{4+})$ | 0.714 | 0.714 | 0.714 | 0.714 | 0.714 | 0.714 | 0.714 |
| | $Nb^{5+}/Ti^{4+}$ | 2.501 | 2.499 | 2.499 | 2.499 | 2.501 | 2.501 | 2.501 |
| | $Zn^{2+} + Ba^{2+} + Sr^{2+} + Ca^{2+}$ | 8.14 | 8.14 | 8.16 | 8.16 | 8.17 | 8.17 | 8.17 |
| | $(Zn^{2+} + Ba^{2+})/(Zn^{2+} + Ba^{2+} + Sr^{2+} + Ca^{2+})$ | 0.9754 | 0.9754 | 0.9755 | 0.9755 | 0.9755 | 0.9266 | 0.9266 |
| | $Li^+ + Na^+ + K^+$ | 32.08 | 32.08 | 32.13 | 32.13 | 32.15 | 32.15 | 32.65 |
| | $Li^+/(Li^+ + Na^+ + K^+)$ | 0.4645 | 0.4645 | 0.4644 | 0.4644 | 0.4644 | 0.4644 | 0.4726 |
| Anionic component (anionic %) | $O^{2-}$ | 100 | 100 | 100 | 100 | 100 | 100 | 100 |
| | Total | 100 | 100 | 100 | 100 | 100 | 100 | 100 |
| Properties | nd | 1.85055 | 1.84960 | 1.85016 | 1.84925 | 1.84976 | 1.84948 | 1.85018 |
| | ng | 1.89558 | 1.89450 | 1.89517 | 1.89415 | 1.89477 | 1.89448 | 1.89521 |
| | nF | 1.87476 | 1.87374 | 1.87435 | 1.87338 | 1.87397 | 1.87367 | 1.87441 |
| | nc | 1.84079 | 1.83987 | 1.84042 | 1.83953 | 1.83998 | 1.83973 | 1.84045 |
| | νd | 25.04 | 25.08 | 25.06 | 25.09 | 25.00 | 25.03 | 25.03 |
| | Pg, F | 0.613 | 0.613 | 0.614 | 0.614 | 0.612 | 0.613 | 0.612 |
| | ΔPg, F | 0.00967 | 0.00978 | 0.01042 | 0.01045 | 0.00864 | 0.00989 | 0.00924 |
| | Liquidus temperature (° C.) | 1060 | 1060 | 1060 | 1060 | 1070 | 1060 | 1070 |
| | Glass transition temperature (° C.) | 506 | 508 | 507 | 506 | 503 | 502 | 504 |
| | Specific gravity | 3.631 | 3.630 | 3.629 | 3.628 | 3.626 | 3.605 | 3.619 |
| | λ80 (nm) | 493 | 495 | 489 | 488 | 472 | 476 | 483 |
| | λ70 (nm) | 426 | 428 | 422 | 422 | 411 | 415 | 420 |
| | λ5 (nm) | 362 | 363 | 361 | 361 | 361 | 360 | 360 |

TABLE 2

| | | No. | | | | | | |
|---|---|---|---|---|---|---|---|---|
| | | 8 | 9 | 10 | 11 | 12 | 13 | 14 |
| Cationic component (cationic %) | $Si^{4+}$ | 23.16 | 23.44 | 23.52 | 24.43 | 23.59 | 23.61 | 24.11 |
| | $B^{3+}$ | 6.90 | 6.98 | 7.00 | 5.99 | 7.02 | 7.03 | 6.53 |
| | $Nb^{5+}$ | 19.71 | 19.95 | 20.01 | 19.94 | 20.07 | 20.09 | 20.09 |
| | $Ti^{4+}$ | 7.89 | 7.98 | 8.00 | 7.98 | 8.03 | 8.04 | 8.04 |
| | $W^{6+}$ | 0.99 | 1.00 | 1.00 | 1.70 | 1.00 | 1.00 | 1.00 |
| | $Zr^{4+}$ | 0.44 | 0.45 | 0.45 | 0.45 | 0.45 | 0.45 | 0.45 |
| | $Zn^{2+}$ | 5.42 | 5.49 | 5.50 | 5.49 | 5.52 | 5.52 | 5.52 |
| | $Ba^{2+}$ | 2.84 | 1.94 | 1.71 | 1.40 | 1.49 | 1.41 | 1.41 |
| | $Sr^{2+}$ | 0.00 | 0.00 | 0.00 | 0.00 | 0.00 | 0.00 | 0.00 |
| | $Ca^{2+}$ | 0.81 | 0.55 | 0.49 | 0.40 | 0.42 | 0.40 | 0.40 |
| | $Li^+$ | 14.79 | 14.96 | 15.01 | 14.96 | 15.05 | 15.07 | 15.07 |
| | $Na^+$ | 13.11 | 13.27 | 13.31 | 13.27 | 13.35 | 13.36 | 13.36 |
| | $K^+$ | 3.94 | 3.99 | 4.00 | 3.99 | 4.01 | 4.02 | 4.02 |
| | Total | 100.00 | 100.00 | 100.00 | 100.00 | 100.00 | 100.00 | 100.00 |
| | $Si^{4+} + B^{3+}$ | 30.06 | 30.42 | 30.52 | 30.42 | 30.61 | 30.64 | 30.64 |
| | $B^{3+}/(B^{3+} + Si^{4+})$ | 0.2295 | 0.2295 | 0.2295 | 0.1969 | 0.2293 | 0.2294 | 0.2131 |
| | $Nb^{5+} + Ti^{4+} + W^{6+} + Zr^{4+}$ | 29.03 | 29.38 | 29.46 | 30.07 | 29.55 | 29.58 | 29.58 |
| | $Zr^{4+}/(Nb^{5+} + Ti^{4+} + W^{6+} + Zr^{4+})$ | 0.0152 | 0.0153 | 0.0153 | 0.0150 | 0.0152 | 0.0152 | 0.0152 |
| | $Nb^{5+} + Ti^{4+}$ | 27.6 | 27.93 | 28.01 | 27.92 | 28.1 | 28.13 | 28.13 |
| | $Nb^{5+}/(Nb^{5+} + Ti^{4+})$ | 0.714 | 0.714 | 0.714 | 0.714 | 0.714 | 0.714 | 0.714 |
| | $Nb^{5+}/Ti^{4+}$ | 2.498 | 2.500 | 2.501 | 2.499 | 2.499 | 2.499 | 2.499 |
| | $Zn^{2+} + Ba^{2+} + Sr^{2+} + Ca^{2+}$ | 9.07 | 7.98 | 7.7 | 7.29 | 7.43 | 7.33 | 7.33 |
| | $(Zn^{2+} + Ba^{2+})/(Zn^{2+} + Ba^{2+} + Sr^{2+} + Ca^{2+})$ | 0.9107 | 0.9311 | 0.9364 | 0.9451 | 0.9435 | 0.9454 | 0.9454 |
| | $L^+ + Na^+ + K^+$ | 31.84 | 32.22 | 32.32 | 32.22 | 32.41 | 32.45 | 32.45 |
| | $Li^+/(L^+ + Na^+ + K^+)$ | 0.4645 | 0.4643 | 0.4644 | 0.4643 | 0.4644 | 0.4644 | 0.4644 |
| Anionic component (anionoc %) | $O^{2-}$ | 100 | 100 | 100 | 100 | 100 | 100 | 100 |
| | Total | 100 | 100 | 100 | 100 | 100 | 100 | 100 |
| Properties | nd | 1.84887 | 1.84997 | 1.85004 | 1.84991 | 1.85002 | 1.85005 | 1.84881 |
| | ng | 1.89336 | 1.89511 | 1.89532 | 1.89543 | 1.89543 | 1.89550 | 1.89415 |
| | nF | 1.87275 | 1.87420 | 1.87433 | 1.87435 | 1.87438 | 1.87448 | 1.87315 |
| | nc | 1.83920 | 1.84019 | 1.84023 | 1.84008 | 1.84017 | 1.84021 | 1.83905 |
| | νd | 25.30 | 24.99 | 24.93 | 24.80 | 24.85 | 24.80 | 24.89 |
| | Pg, F | 0.614 | 0.615 | 0.616 | 0.615 | 0.615 | 0.613 | 0.616 |
| | ⊿Pg, F | 0.01155 | 0.0115 | 0.01212 | 0.01146 | 0.01175 | 0.0097 | 0.01234 |
| | Liquidus temperature (° C.) | 1080 | 1060 | 1060 | 1020 | 1030 | 1030 | 1030 |
| | Glass transition temperature (° C.) | 506 | 505 | 504 | 505 | 503 | 504 | 505 |
| | Specific gravity | | | | 3.617 | 3.588 | 3.577 | 3.586 |
| | λ80 (nm) | | | | 508 | | | 498 |
| | λ70 (nm) | | | | 434 | | | 424 |
| | λ5 (nm) | | | | 363 | | | 362 |

TABLE 3

| | | No. | | | | | | |
|---|---|---|---|---|---|---|---|---|
| | | 15 | 16 | 17 | 18 | 19 | 20 | 21 |
| Cationic component (cationic %) | $Si^{4+}$ | 24.61 | 24.11 | 24.12 | 24.14 | 24.20 | 24.26 | 23.15 |
| | $B^{3+}$ | 6.03 | 6.53 | 6.53 | 6.54 | 6.55 | 6.57 | 7.55 |
| | $Nb^{5+}$ | 20.09 | 20.09 | 20.09 | 20.11 | 20.17 | 20.21 | 20.14 |
| | $Ti^{4+}$ | 8.04 | 8.04 | 8.04 | 7.54 | 7.81 | 7.58 | 7.91 |
| | $W^{6+}$ | 1.00 | 1.00 | 1.00 | 1.51 | 1.01 | 1.01 | 1.01 |
| | $Zr^{4+}$ | 0.45 | 0.45 | 0.45 | 0.45 | 0.45 | 0.45 | 0.45 |
| | $Zn^{2+}$ | 5.52 | 5.52 | 5.52 | 5.53 | 5.54 | 5.56 | 5.54 |
| | $Ba^{2+}$ | 1.41 | 1.41 | 1.41 | 1.33 | 1.33 | 1.33 | 1.33 |
| | $Sr^{2+}$ | 0.00 | 0.00 | 0.00 | 0.00 | 0.00 | 0.00 | 0.00 |
| | $Ca^{2+}$ | 0.40 | 0.40 | 0.40 | 0.38 | 0.38 | 0.38 | 0.38 |
| | $Li^+$ | 15.07 | 15.07 | 15.07 | 15.08 | 15.12 | 15.16 | 15.11 |
| | $Na^+$ | 13.36 | 13.86 | 14.36 | 14.88 | 14.92 | 14.96 | 15.11 |
| | $K^+$ | 4.02 | 3.52 | 3.01 | 2.51 | 2.52 | 2.53 | 2.32 |
| | Total | 100.00 | 100.00 | 100.00 | 100.00 | 100.00 | 100.00 | 100.00 |
| | $Si^{4+} + B^{3+}$ | 30.64 | 30.64 | 30.65 | 30.68 | 30.75 | 30.83 | 30.7 |
| | $B^{3+}/(B^{3+} + Si^{4+})$ | 0.1968 | 0.2131 | 0.2131 | 0.2132 | 0.2130 | 0.2131 | 0.2459 |
| | $Nb^{5+} + Ti^{4+} + W^{6+} + Zr^{4+}$ | 29.58 | 29.58 | 29.58 | 29.61 | 29.44 | 29.25 | 29.51 |
| | $Zr^{4+}/(Nb^{5+} + Ti^{4+} + W^{6+} + Zr^{4+})$ | 0.0152 | 0.0152 | 0.0152 | 0.0152 | 0.0153 | 0.0154 | 0.0152 |
| | $Nb^{5+} + Ti^{4+}$ | 28.13 | 28.13 | 28.13 | 27.65 | 27.98 | 27.79 | 28.05 |
| | $Nb^{5+}/(Nb^{5+} + Ti^{4+})$ | 0.714 | 0.714 | 0.714 | 0.727 | 0.721 | 0.727 | 0.718 |
| | $Nb^{5+}/Ti^{4+}$ | 2.499 | 2.499 | 2.499 | 2.667 | 2.583 | 2.666 | 2.546 |

TABLE 3-continued

| | | No. | | | | | | |
|---|---|---|---|---|---|---|---|---|
| | | 15 | 16 | 17 | 18 | 19 | 20 | 21 |
| | $Zn^{2+} + Ba^{2+} + Sr^{2+} + Ca^{2+}$ | 7.33 | 7.33 | 7.33 | 7.24 | 7.25 | 7.27 | 7.25 |
| | $(Zn^{2+} + Ba^{2+})/(Zn^{2+} + Ba^{2+} + Sr^{2+} + Ca^{2+})$ | 0.9454 | 0.9454 | 0.9454 | 0.9475 | 0.9476 | 0.9477 | 0.9476 |
| | $L^+ + Na^+ + K^+$ | 32.45 | 32.45 | 32.44 | 32.47 | 32.56 | 32.65 | 32.54 |
| | $Li^+/(L^+ + Na^+ + K^+)$ | 0.4644 | 0.4644 | 0.4645 | 0.4644 | 0.4644 | 0.4643 | 0.4644 |
| Anionic component (anionoc %) | $O^{2-}$ | 100 | 100 | 100 | 100 | 100 | 100 | 100 |
| | Total | 100 | 100 | 100 | 100 | 100 | 100 | 100 |
| Properties | nd | 1.84765 | 1.84987 | 1.85107 | 1.84992 | 1.85031 | 1.84876 | 1.85383 |
| | ng | 1.89285 | 1.89531 | 1.89662 | 1.89527 | 1.89575 | 1.89394 | 1.89971 |
| | nF | 1.87193 | 1.87424 | 1.87556 | 1.87429 | 1.87467 | 1.87305 | 1.87847 |
| | nc | 1.83789 | 1.84006 | 1.84120 | 1.84013 | 1.84048 | 1.83898 | 1.84390 |
| | vd | 24.90 | 24.86 | 24.77 | 24.88 | 24.87 | 24.91 | 24.70 |
| | Pg, F | 0.615 | 0.616 | 0.613 | 0.614 | 0.617 | 0.613 | 0.614 |
| | ⊿Pg, F | 0.01109 | 0.01289 | 0.00921 | 0.01065 | 0.01302 | 0.00969 | 0.01057 |
| | Liquidus temperature (° C.) | 1030 | 1030 | 1030 | 1020 | 1020 | 1020 | 1020 |
| | Glass transition temperature (° C.) | 508 | 507 | 507 | 504 | 508 | 505 | 504 |
| | Specific gravity | 3.581 | 3.584 | 3.589 | 3.616 | 3.591 | 3.590 | 3.589 |
| | λ80 (nm) | 501 | 490 | 500 | 503 | 497 | 497 | 498 |
| | λ70 (nm) | 426 | 421 | 429 | 428 | 423 | 424 | 431 |
| | λ5 (nm) | 362 | 361 | 362 | 363 | 361 | 361 | 362 |

TABLE 4

| | | No. | | | | | | |
|---|---|---|---|---|---|---|---|---|
| | | 22 | 23 | 24 | 25 | 26 | 27 | 28 |
| Cationic component (cationic %) | $Si^{4+}$ | 23.16 | 23.73 | 24.07 | 24.49 | 24.87 | 24.30 | 24.68 |
| | $B^{3+}$ | 7.55 | 7.50 | 7.91 | 7.42 | 7.39 | 7.44 | 7.40 |
| | $Nb^{5+}$ | 20.14 | 19.99 | 21.26 | 19.79 | 19.70 | 19.84 | 19.74 |
| | $Ti^{4+}$ | 7.91 | 7.85 | 7.76 | 7.77 | 7.73 | 7.79 | 7.75 |
| | $W^{6+}$ | 1.01 | 1.00 | 0.99 | 0.99 | 0.98 | 0.99 | 0.99 |
| | $Zr^{4+}$ | 0.45 | 0.45 | 0.44 | 0.45 | 0.44 | 0.45 | 0.44 |
| | $Zn^{2+}$ | 6.55 | 5.50 | 5.44 | 5.44 | 5.42 | 5.46 | 5.43 |
| | $Ba^{2+}$ | 1.33 | 1.32 | 1.30 | 1.31 | 1.30 | 1.31 | 1.30 |
| | $Sr^{2+}$ | 0.00 | 0.00 | 0.00 | 0.00 | 0.00 | 0.00 | 0.00 |
| | $Ca^{2+}$ | 0.38 | 0.38 | 0.38 | 0.38 | 0.37 | 0.38 | 0.38 |
| | $Li^+$ | 14.60 | 14.99 | 14.09 | 14.84 | 14.77 | 14.88 | 14.81 |
| | $Na^+$ | 14.60 | 14.99 | 14.09 | 14.84 | 14.77 | 14.88 | 14.81 |
| | $K^+$ | 2.32 | 2.30 | 2.27 | 2.28 | 2.26 | 2.28 | 2.27 |
| | Total | 100.00 | 100.00 | 100.00 | 100.00 | 100.00 | 100.00 | 100.00 |
| | $Si^{4+} + B^{3+}$ | 30.71 | 31.23 | 31.98 | 31.91 | 32.26 | 31.74 | 32.08 |
| | $B^{3+}/(B^{3+} + Si^{4+})$ | 0.2458 | 0.2402 | 0.2473 | 0.2325 | 0.2291 | 0.2344 | 0.2307 |
| | $Nb^{5+} + Ti^{4+} + W^{6+} + Zr^{4+}$ | 29.51 | 29.29 | 30.45 | 29 | 28.85 | 29.07 | 28.92 |
| | $Zr^{4+}/(Nb^{5+} + Ti^{4+} + W^{6+} + Zr^{4+})$ | 0.0152 | 0.0154 | 0.0144 | 0.0155 | 0.0153 | 0.0155 | 0.0152 |
| | $Nb^{5+} + Ti^{4+}$ | 28.05 | 27.84 | 29.02 | 27.56 | 27.43 | 27.63 | 27.49 |
| | $Nb^{5+}/(Nb^{5+} + Ti^{4+})$ | 0.718 | 0.718 | 0.733 | 0.718 | 0.718 | 0.718 | 0.718 |
| | $Nb^{5+}/Ti^{4+}$ | 2.546 | 2.546 | 2.740 | 2.547 | 2.549 | 2.547 | 2.547 |
| | $Zn^{2+} + Ba^{2+} + Sr^{2+} + Ca^{2+}$ | 8.26 | 7.2 | 7.12 | 7.13 | 7.09 | 7.15 | 7.11 |
| | $(Zn^{2+} + Ba^{2+})/(Zn^{2+} + Ba^{2+} + Sr^{2+} + Ca^{2+})$ | 0.9540 | 0.9472 | 0.9466 | 0.9467 | 0.9478 | 0.9469 | 0.9466 |
| | $L^+ + Na^+ + K^+$ | 31.52 | 32.28 | 30.45 | 31.96 | 31.8 | 32.04 | 31.89 |
| | $Li^+/(L^+ + Na^+ + K^+)$ | 0.4632 | 0.4644 | 0.4627 | 0.4643 | 0.4645 | 0.4644 | 0.4644 |
| Anionic component (anionoc %) | $O^{2-}$ | 100 | 100 | 100 | 100 | 100 | 100 | 100 |
| | Total | 100 | 100 | 100 | 100 | 100 | 100 | 100 |
| Properties | nd | 1.85584 | 1.84970 | 1.85888 | 1.84537 | 1.84318 | 1.84623 | 1.84423 |
| | ng | 1.90185 | 1.89512 | 1.90569 | 1.89025 | 1.88782 | 1.89122 | 1.88900 |
| | nF | 1.88053 | 1.87412 | 1.88399 | 1.86948 | 1.86718 | 1.87040 | 1.86829 |
| | nc | 1.84589 | 1.83994 | 1.84876 | 1.83566 | 1.83351 | 1.83648 | 1.83455 |
| | vd | 24.71 | 24.86 | 24.38 | 25.00 | 25.04 | 24.95 | 25.02 |
| | Pg, F | 0.615 | 0.614 | 0.616 | 0.614 | 0.613 | 0.614 | 0.614 |
| | ⊿Pg, F | 0.01165 | 0.01084 | 0.01154 | 0.01083 | 0.00978 | 0.01041 | 0.01055 |
| | Liquidus temperature (° C.) | 1020 | 1010 | 1020 | 1010 | 1020 | 1020 | 1010 |
| | Glass transition temperature (° C.) | 501 | 504 | 508 | 505 | 504 | 506 | 506 |
| | Specific gravity | 3.611 | 3.583 | 3.598 | 3.565 | 3.559 | 3.570 | 3.564 |
| | λ80 (nm) | 496 | | | | | | |
| | λ70 (nm) | 432 | | | | | | |
| | λ5 (nm) | 362 | | | | | | |

TABLE 5

|  |  | No. | | | | | | |
|---|---|---|---|---|---|---|---|---|
|  |  | 29 | 30 | 31 | 32 | 33 | 34 | 35 |
| Cationic component (cationic %) | $Si^{4+}$ | 24.52 | 24.83 | 23.04 | 22.54 | 22.74 | 22.24 | 21.35 |
|  | $B^{3+}$ | 7.42 | 7.39 | 8.90 | 9.40 | 9.48 | 9.48 | 10.03 |
|  | $Nb^{5+}$ | 19.78 | 19.70 | 19.78 | 19.78 | 19.95 | 20.45 | 21.05 |
|  | $Ti^{4+}$ | 7.76 | 7.73 | 7.76 | 7.76 | 6.98 | 6.98 | 6.52 |
|  | $W^{6+}$ | 0.99 | 0.99 | 0.99 | 0.99 | 1.00 | 1.00 | 1.00 |
|  | $Zr^{4+}$ | 0.45 | 0.44 | 0.45 | 0.45 | 0.45 | 0.45 | 0.45 |
|  | $Zn^{2+}$ | 5.44 | 5.42 | 5.44 | 5.44 | 5.49 | 5.49 | 5.51 |
|  | $Ba^{2+}$ | 1.31 | 1.30 | 1.31 | 1.31 | 1.32 | 1.32 | 1.32 |
|  | $Sr^{2+}$ | 0.00 | 0.00 | 0.00 | 0.00 | 0.00 | 0.00 | 0.00 |
|  | $Ca^{2+}$ | 0.38 | 0.37 | 0.38 | 0.38 | 0.38 | 0.38 | 0.38 |
|  | $Li^+$ | 14.84 | 14.78 | 14.84 | 14.84 | 14.96 | 14.96 | 15.04 |
|  | $Na^+$ | 14.84 | 14.78 | 14.84 | 14.84 | 14.96 | 14.96 | 15.04 |
|  | $K^+$ | 2.27 | 2.27 | 2.27 | 2.27 | 2.29 | 2.29 | 2.31 |
|  | Total | 100.00 | 100.00 | 100.00 | 100.00 | 100.00 | 100.00 | 100.00 |
|  | $Si^{4+} + B^{3+}$ | 31.94 | 32.22 | 31.94 | 31.94 | 32.22 | 31.72 | 31.38 |
|  | $B^{3+}/(B^{3+} + Si^{4+})$ | 0.2323 | 0.2294 | 0.2786 | 0.2943 | 0.2942 | 0.2989 | 0.3196 |
|  | $Nb^{5+} + Ti^{4+} + W^{6+} + Zr^{4+}$ | 28.98 | 28.86 | 28.98 | 28.98 | 28.38 | 28.88 | 29.02 |
|  | $Zr^{4+}/(Nb^{5+} + Ti^{4+} + W^{6+} + Zr^{4+})$ | 0.0155 | 0.0152 | 0.0155 | 0.0155 | 0.0159 | 0.0156 | 0.0155 |
|  | $Nb^{5+} + Ti^{4+}$ | 27.54 | 27.43 | 27.54 | 27.54 | 26.93 | 27.43 | 27.57 |
|  | $Nb^{5+}/(Nb^{5+} + Ti^{4+})$ | 0.718 | 0.718 | 0.718 | 0.718 | 0.741 | 0.746 | 0.764 |
|  | $Nb^{5+}/Ti^{4+}$ | 2.549 | 2.549 | 2.549 | 2.549 | 2.858 | 2.930 | 3.229 |
|  | $Zn^{2+} + Ba^{2+} + Sr^{2+} + Ca^{2+}$ | 7.13 | 7.09 | 7.13 | 7.13 | 7.19 | 7.19 | 7.21 |
|  | $(Zn^{2+} + Ba^{2+})/(Zn^{2+} + Ba^{2+} + Sr^{2+} + Ca^{2+})$ | 0.9467 | 0.9478 | 0.9467 | 0.9467 | 0.9471 | 0.9471 | 0.9473 |
|  | $Li^+ + Na^+ + K^+$ | 31.95 | 31.83 | 31.95 | 31.95 | 32.21 | 32.21 | 32.39 |
|  | $Li^+/(Li^+ + Na^+ + K^+)$ | 0.4645 | 0.4643 | 0.4645 | 0.4645 | 0.4645 | 0.4645 | 0.4643 |
| Anionic component (anionic %) | $O^{2-}$ | 100 | 100 | 100 | 100 | 100 | 100 | 100 |
|  | Total | 100 | 100 | 100 | 100 | 100 | 100 | 100 |
| Properties | nd | 1.84524 | 1.84359 | 1.84756 | 1.84853 | 1.84308 | 1.84855 | 1.85187 |
|  | ng | 1.89008 | 1.88823 | 1.89268 | 1.89380 | 1.88743 | 1.89363 | 1.89724 |
|  | nF | 1.86929 | 1.86752 | 1.87175 | 1.87284 | 1.86693 | 1.87275 | 1.87623 |
|  | nc | 1.83550 | 1.83387 | 1.83777 | 1.83873 | 1.83346 | 1.83880 | 1.84207 |
|  | νd | 25.01 | 25.07 | 24.94 | 24.88 | 25.19 | 24.99 | 24.94 |
|  | Pg, F | 0.615 | 0.615 | 0.616 | 0.614 | 0.612 | 0.615 | 0.615 |
|  | ⊿Pg, F | 0.01199 | 0.01228 | 0.01254 | 0.01097 | 0.00953 | 0.0117 | 0.01164 |
|  | Liquidus temperature (° C.) | 1015 | 1015 | 1015 | 1015 | 1015 | 1020 | 1015 |
|  | Glass transition temperature (° C.) | 506 | 506 | 500 | 499 | 497 | 499 | 493 |
|  | Specific gravity | 3.564 | 3.559 | 3.568 | 3.571 | 3.574 | 3.589 | 3.607 |
|  | λ80 (nm) |  |  |  |  |  | 503 | 494 |
|  | λ70 (nm) |  |  |  |  |  | 430 | 426 |
|  | λ5 (nm) |  |  |  |  |  | 361 | 360 |

TABLE 6

|  |  | No. | | | | | | |
|---|---|---|---|---|---|---|---|---|
|  |  | 36 | 37 | 38 | 39 | 40 | 41 | 42 |
| Cationic component (cationic %) | $Si^{4+}$ | 20.88 | 20.40 | 19.92 | 19.92 | 19.92 | 19.92 | 19.92 |
|  | $B^{3+}$ | 10.54 | 11.06 | 11.58 | 11.58 | 11.58 | 11.58 | 11.58 |
|  | $Nb^{5+}$ | 21.08 | 21.11 | 20.73 | 20.53 | 20.33 | 20.93 | 21.13 |
|  | $Ti^{4+}$ | 6.39 | 6.26 | 6.14 | 6.14 | 6.14 | 6.14 | 6.14 |
|  | $W^{6+}$ | 1.00 | 1.01 | 1.41 | 1.61 | 1.81 | 1.21 | 1.01 |
|  | $Zr^{4+}$ | 0.45 | 0.45 | 0.45 | 0.45 | 0.45 | 0.45 | 0.45 |
|  | $Zn^{2+}$ | 5.52 | 5.53 | 5.54 | 5.54 | 5.54 | 5.54 | 5.54 |
|  | $Ba^{2+}$ | 1.33 | 1.33 | 1.33 | 1.33 | 1.33 | 1.33 | 1.33 |
|  | $Sr^{2+}$ | 0.00 | 0.00 | 0.00 | 0.00 | 0.00 | 0.00 | 0.00 |
|  | $Ca^{2+}$ | 0.38 | 0.38 | 0.38 | 0.38 | 0.38 | 0.38 | 0.38 |
|  | $Li^+$ | 15.06 | 15.08 | 15.10 | 15.10 | 15.10 | 15.10 | 15.10 |
|  | $Na^+$ | 15.06 | 15.08 | 15.10 | 15.10 | 15.10 | 15.10 | 15.10 |
|  | $K^+$ | 2.31 | 2.31 | 2.32 | 2.32 | 2.32 | 2.32 | 2.32 |
|  | Total | 100.00 | 100.00 | 100.00 | 100.00 | 100.00 | 100.00 | 100.00 |
|  | $Si^{4+} + B^{3+}$ | 31.42 | 31.46 | 31.5 | 31.5 | 31.5 | 31.5 | 31.5 |
|  | $B^{3+}/(B^{3+} + Si^{4+})$ | 0.3355 | 0.3516 | 0.3676 | 0.3676 | 0.3676 | 0.3676 | 0.3676 |
|  | $Nb^{5+} + Ti^{4+} + W^{6+} + Zr^{4+}$ | 28.92 | 28.83 | 28.73 | 28.73 | 28.73 | 28.73 | 28.73 |
|  | $Zr^{4+}/(Nb^{5+} + Ti^{4+} + W^{6+} + Zr^{4+})$ | 0.0156 | 0.0156 | 0.0157 | 0.0157 | 0.0157 | 0.0157 | 0.0157 |
|  | $Nb^{5+} + Ti^{4+}$ | 27.47 | 27.37 | 26.87 | 26.67 | 26.47 | 27.07 | 27.27 |
|  | $Nb^{5+}/(Nb^{5+} + Ti^{4+})$ | 0.767 | 0.771 | 0.771 | 0.770 | 0.768 | 0.773 | 0.775 |
|  | $Nb^{5+}/Ti^{4+}$ | 3.299 | 3.372 | 3.376 | 3.344 | 3.311 | 3.409 | 3.441 |

TABLE 6-continued

| | | No. | | | | | | |
|---|---|---|---|---|---|---|---|---|
| | | 36 | 37 | 38 | 39 | 40 | 41 | 42 |
| | $Zn^{2+} + Ba^{2+} + Sr^{2+} + Ca^{2+}$ | 7.23 | 7.24 | 7.25 | 7.25 | 7.25 | 7.25 | 7.25 |
| | $(Zn^{2+} + Ba^{2+})/(Zn^{2+} + Ba^{2+} + Sr^{2+} + Ca^{2+})$ | 0.9474 | 0.9475 | 0.9476 | 0.9476 | 0.9476 | 0.9476 | 0.9476 |
| | $L^+ + Na^+ + K^+$ | 32.43 | 32.47 | 32.52 | 32.52 | 32.52 | 32.52 | 32.52 |
| | $Li^+/(L^+ + Na^+ + K^+)$ | 0.4644 | 0.4644 | 0.4643 | 0.4643 | 0.4643 | 0.4643 | 0.4643 |
| Anionic component (anionic %) | $O^{2-}$ | 100 | 100 | 100 | 100 | 100 | 100 | 100 |
| | Total | 100 | 100 | 100 | 100 | 100 | 100 | 100 |
| Properties | nd | 1.85211 | 1.85210 | 1.85049 | 1.84953 | 1.84885 | 1.85154 | 1.85248 |
| | ng | 1.89743 | 1.89742 | 1.89554 | 1.89443 | 1.89367 | 1.89672 | 1.89779 |
| | nF | 1.87643 | 1.87647 | 1.87470 | 1.87365 | 1.87292 | 1.87581 | 1.87683 |
| | nc | 1.84228 | 1.84228 | 1.84074 | 1.83978 | 1.83912 | 1.84175 | 1.84269 |
| | νd | 24.95 | 24.92 | 25.04 | 25.08 | 25.11 | 25.00 | 24.97 |
| | Pg, F | 0.615 | 0.613 | 0.614 | 0.614 | 0.614 | 0.614 | 0.614 |
| | ⊿Pg, F | 0.01154 | 0.00931 | 0.01044 | 0.01037 | 0.0108 | 0.01062 | 0.01059 |
| | Liquidus temperature (° C.) | 1020 | 1020 | 1020 | 1015 | 1020 | 1020 | 1020 |
| | Glass transition temperature (° C.) | 491 | 493 | 488 | 490 | 486 | 488 | 489 |
| | Specific gravity | 3.608 | 3.611 | 3.629 | 3.627 | 3.641 | 3.613 | 3.606 |
| | λ80 (nm) | 498 | 504 | 484 | 492 | 497 | 501 | 506 |
| | λ70 (nm) | 429 | 432 | 420 | 425 | 428 | 431 | 433 |
| | λ5 (nm) | 361 | 361 | 360 | 360 | 361 | 361 | 361 |

TABLE 7

| | | No. | | | | |
|---|---|---|---|---|---|---|
| | | 43 | 44 | 45 | 46 | 47 |
| Cationic component (cationic %) | $Si^{4+}$ | 19.93 | 25.55 | 26.00 | 26.00 | 23.50 |
| | $B^{3+}$ | 11.58 | 7.72 | 2.00 | 2.00 | 7.50 |
| | $Nb^{5+}$ | 20.12 | 20.60 | 21.00 | 20.60 | 19.50 |
| | $Ti^{4+}$ | 6.14 | 3.96 | 8.00 | 8.00 | 9.00 |
| | $W^{6+}$ | 2.01 | 1.03 | 0.00 | 0.00 | 0.00 |
| | $Zr^{4+}$ | 0.45 | 0.46 | 0.00 | 0.80 | 0.00 |
| | $Zn^{2+}$ | 5.54 | 5.66 | 5.50 | 5.50 | 5.50 |
| | $Ba^{2+}$ | 1.33 | 1.36 | 0.50 | 0.50 | 1.50 |
| | $Sr^{2+}$ | 0.00 | 0.00 | 0.00 | 0.00 | 0.00 |
| | $Ca^{2+}$ | 0.38 | 0.39 | 0.20 | 0.20 | 0.20 |
| | $Li^+$ | 15.10 | 15.45 | 16.00 | 16.00 | 15.00 |
| | $Na^+$ | 15.10 | 15.45 | 16.80 | 16.80 | 14.30 |
| | $K^+$ | 2.32 | 2.37 | 4.00 | 3.60 | 4.00 |
| | Total | 100.00 | 100.00 | 100.00 | 100.00 | 100.00 |
| | $Si^{4+} + B^{3+}$ | 31.51 | 33.27 | 28 | 28 | 31 |
| | $B^{3+}/(B^{3+} + Si^{4+})$ | 0.3675 | 0.2320 | 0.0714 | 0.0714 | 0.2419 |
| | $Nb^{5+} + Ti^{4+} + W^{6+} + Zr^{4+}$ | 28.72 | 26.05 | 29 | 29.4 | 28.5 |
| | $Zr^{4+}/(Nb^{5+} + Ti^{4+} + W^{6+} + Zr^{4+})$ | 0.0157 | 0.0177 | 0.0000 | 0.0272 | 0.0000 |
| | $Nb^{5+} + Ti^{4+}$ | 26.26 | 24.56 | 29 | 28.6 | 28.5 |
| | $Nb^{5+}/(Nb^{5+} + Ti^{4+})$ | 0.766 | 0.839 | 0.724 | 0.720 | 0.684 |
| | $Nb^{5+}/Ti^{4+}$ | 3.277 | 5.202 | 2.625 | 2.575 | 2.167 |
| | $Zn^{2+} + Ba^{2+} + Sr^{2+} + Ca^{2+}$ | 7.25 | 7.41 | 6.2 | 6.2 | 7.2 |
| | $(Zn^{2+} + Ba^{2+})/(Zn^{2+} + Ba^{2+} + Sr^{2+} + Ca^{2+})$ | 0.9476 | 0.9474 | 0.9677 | 0.9677 | 0.9722 |
| | $L^+ + Na^+ + K^+$ | 32.52 | 33.27 | 36.8 | 36.4 | 33.3 |
| | $Li^+/(L^+ + Na^+ + K^+)$ | 0.4643 | 0.4644 | 0.4348 | 0.4396 | 0.4505 |
| Anionic component (anionic %) | $O^{2-}$ | 100 | 100 | 100 | 100 | 100 |
| | Total | 100 | 100 | 100 | 100 | 100 |
| Properties | nd | 1.84771 | 1.81773 | 1.84111 | 1.84297 | 1.84577 |
| | ng | 1.89240 | 1.85807 | 1.88578 | 1.88757 | 1.89107 |
| | nF | 1.87173 | 1.83941 | 1.86515 | 1.86697 | 1.87012 |
| | nc | 1.83802 | 1.80886 | 1.83145 | 1.83333 | 1.83597 |
| | νd | 25.15 | 26.77 | 24.96 | 25.06 | 24.77 |
| | Pg, F | 0.613 | 0.611 | 0.612 | 0.612 | 0.613 |
| | ⊿Pg, F | 0.01014 | 0.01014 | 0.008794 | 0.009174 | 0.00976 |
| | Liquidus temperature (° C.) | 1020 | 1050 | 1080 | 1070 | 1050 |
| | Glass transition temperature (° C.) | 487 | 500 | 516 | 517 | 502 |
| | Specific gravity | 3.643 | | 3.489 | 3.5 | 3.501 |
| | λ80 (nm) | | | | | |
| | λ70 (nm) | | | | | |
| | λ5 (nm) | | | | | |

The optical glasses were measured for various properties by the following methods.

(1) Refractive Indexes nd, ng, nF and nc and Abbe's Number vd

A glass obtained by temperature decrease at a temperature decrease rate of −30° C./hour was measured for refractive indexes, nd, ng, nF, nc and an Abbe's number vd according to the refractivity measuring method of Japan Optical Glass Industrial Society Standard.

(2) Liquidus Temperature LT

A glass was placed in a furnace heated to a predetermined temperature and held therein for 2 hours, and after it was cooled, the glass was internally observed through an optical microscope of 100 magnifications. The liquidus temperature of the glass was determined on the basis of whether or not a crystal was present.

(3) Glass Transition Temperature Tg

A glass was measured at a temperature elevation rate of 10° C./minute with a differential scanning calorimeter (DSC).

(4) Partial Dispersion Ratio Pg,F

A partial dispersion ratio was calculated from refractive indexes ng, nF and nc.

(5) Deviation ΔPg,F of Partial Dispersion Ratio from Normal Line

A deviation was calculated from a partial dispersion ratio $Pg,F^{(0)}$ on a normal line calculated from a partial dispersion ratio Pg,F and an Abbe's number vd.

Comparative Example 1

Glasses were melted according to a method described in Patent Document 2 so as to obtain compositions of Examples 1 to 13 of Patent Document 2. In compositions of Examples 1 and 2, glasses were devitrified while they were stirred, and in those of Examples 4 to 13, no glasses were formed. In a compositions of Example 3, a melt was cast into a casting mold to give a glass, while the deposition of a crystal was observed inside.

Example 2

Glass raw materials prepared so as to give the optical glasses produced in Example 1 were melted, clarified and homogenized to obtain molten glasses. Each molten glass was dropped from a nozzle made of platinum and received with a preform shaping mold, and a spherical preform was shaped while causing it to float by applying gas pressure. In this manner, spherical performs formed of the above various glasses were formed.

Further, the above molten glass was caused to continuously flow out of a pipe formed of platinum, its lower end portion was received with a preform, and after a narrow portion was formed in the molten glass flow, the preform receiving mold was moved rapidly vertically downward to cut the molten glass flow at the narrow portion. A separated glass gob was received on the preform shaping mold, and a preform was formed while it was caused to float by applying gas pressure. In this manner, preforms formed of the above various glasses were formed.

The thus-obtained preforms were optically homogeneous and had high quality.

Example 3

Molten glasses prepared in Example 2 were caused to continuously flow out and cast into casting molds to form glass blocks, and the glass blocks were annealed and cut to obtain a plurality of glass pieces each. These glass pieces were ground and polished to obtain preforms formed of the above various glasses.

The thus-obtained preforms were optically homogeneous and had high quality.

Example 4

The preforms prepared in Examples 2 and 3 were surface-coated with a carbon-containing film each. Each preform was separately introduced into a press mold having upper and lower mold members and sleeve member made of SiC, and such a preform and the press mold were heated together in a nitrogen atmosphere to soften the preform, and the preform was precision press-molded. In this manner, there were obtained various lenses formed of the above various glasses, such as aspherical convex meniscus lenses, aspherical concave meniscus lenses, aspherical biconvex lenses and aspherical biconcave lenses. The conditions for the precision press-molding were adjusted within ranges described already.

When the thus-obtained various lenses were observed, there were found no white turbidity caused by phase separation, etc., and none of damage, cloudiness and breaking were found on the lens surfaces.

The above process was repeated to carry out a mass-production test with regard to the various lenses, while failures such as the fusion of a glass and a press mold, etc., did not take place, and there could be highly accurately produced lenses that had high quality on surfaces and inside. The thus-produced lenses may be surface-coated with an anti-reflection film each.

The above preforms coated with a carbon-containing film each were heated to soften them, and each preform was separately introduced into a pre-heated press mold and precision press-molded. In this manner, there were produced various lenses of the above various lenses such as aspherical convex lenses, aspherical concave meniscus lenses, aspherical biconvex lenses and aspherical biconcave lenses. The conditions for the precision press-molding were adjusted within ranges described already.

When the thus-obtained various lenses were observed, there were found no white turbidity caused by phase separation, etc., and none of damage, cloudiness and breaking were found on the lens surfaces.

The above process was repeated to carry out a mass-production test with regard to the various lenses, while failures such as the fusion of a glass and a press mold, etc., did not take place, and there could be highly accurately produced lenses that had high quality on surfaces and inside. The thus-produced lenses may be surface-coated with an anti-reflection film each.

Various optical elements such as prisms, micro lenses, lens array, etc., can be also produced by changing the molding surface of the press mold as required.

Comparative Example 2

An optical glass shown in the following Table 8 was prepared, and precision press-molding preforms were produced from the glass. When the preforms were precision press-molded in the same manner as in Example 4 to produce lenses, and many bubbles were found in the lens surfaces. FIGS. 1(a) and 1(b) show magnified photographs taken of the lens surfaces.

TABLE 8

|  |  | Comparative Example 2 |
|---|---|---|
| Cationic component (cationic %) | $Si^{4+}$ | 27.00 |
|  | $B^{3+}$ | 2.00 |
|  | $Nb^{5+}$ | 21.00 |
|  | $Ti^{4+}$ | 7.00 |
|  | $W^{6+}$ | 1.00 |
|  | $Zr^{4+}$ | 3.00 |
|  | $Zn^{2+}$ | 2.00 |
|  | $Ba^{2+}$ | 1.00 |
|  | $Sr^{2+}$ | 0.00 |
|  | $Ca^{2+}$ | 1.00 |
|  | $Li^+$ | 16.00 |
|  | $Na^+$ | 15.00 |
|  | $K^+$ | 4.00 |
|  | Total | 100.00 |
|  | $Si^{4+} + B^{3+}$ | 29 |
|  | $B^{3+}/(B^{3+} + Si^{4+})$ | 0.0690 |
|  | $Nb^{5+} + Ti^{4+} + W^{6+} + Zr^{4+}$ | 32 |
|  | $Zr^{4+}/(Nb^{5+} + Ti^{4+} + W^{6+} + Zr^{4+})$ | 0.0938 |
|  | $Zn^{2+} + Ba^{2+} + Sr^{2+} + Ca^{2+}$ | 4 |
|  | $(Zn^{2+} + Ba^{2+})/(Zn^{2+} + Ba^{2+} + Sr^{2+} + Ca^{2+})$ | 0.7500 |
|  | $L^+ + Na^+ + K^+$ | 35 |
| Anionic component (anionic %) | $O^{2-}$ | 100 |
|  | Total | 100 |
| Properties | nd | 1.84782 |
|  | vd | 25.27 |
|  | Liquidus temperature (° C.) | 1090 |
|  | Glass transition temperature (° C.) | 538 |

Example 5

Various interchangeable lenses for a single-lens reflex camera were made from various lenses produced in Example 4.

Further, various optical systems for compact digital cameras were made from various lenses produced in Example 4 and modularized. Further, image sensors such as CCD, CMOS, etc., were attached to these optical systems for modularization.

When various lenses produced in Example 4 are used as described above, there can be obtained high-function compact optical systems, interchangeable lenses, lens modules and image-sensing devices. When lenses produced in Example 4 are combined with lenses formed of high-refractivity low-dispersion optical glasses, there can be obtained various optical systems that perform chromatic aberration of high order and image-sensing devices having these optical systems.

INDUSTRIAL UTILITY

The optical glass of this invention has high-refractivity high-dispersion properties and excellent devitrification resistance and has a low glass transition temperature, and it is an optical glass excellent for precision press-molding. Further, it is an optical glass suitable for correcting chromatic aberration of high order, and is suitably used for precision press-molding preforms and optical elements.

The invention claimed is:
1. An optical glass that is an oxide glass and comprises, by cationic %,
20 to 40% of a total of $Si^{4+}$ and $B^{3+}$,
15 to 40% of a total of $Nb^{5+}$, $Ti^{4+}$, $W^{6+}$ and $Zr^{4+}$,
0.2 to 20% of a total of $Zn^{2+}$, $Ba^{2+}$, $Sr^{2+}$ and $Ca^{2+}$, and
15 to 55% of a total of $Li^+$, $Na^+$ and $K^+$,
the cationic ratio of the content of $B^{3+}$ to the total content of $B^{3+}$ and $Si^{4+}$ being 0.01-0.5,
the cationic ratio of the content of $Zr^{4+}$ to the total content of $Nb^{5+}$, $Ti^{4+}$, $W^{6+}$ and $Zr^{4+}$ being 0.05 or less,
the cationic ratio of the content of $Nb^{5+}$ to the total content of $Nb^{5+}$ and $T^{4+}$, $(Nb^{5+}/(Nb^{5+}+Ti^{4+}))$, is 0.65-1,
the molar ratio of the total content of $Zn^{2+}$ and $Ba^{2+}$ to the total content of $Zn^{2+}$, $Ba^{2+}$, $Sr^{2+}$ and $Ca^{2+}$ being 0.8-1,
the optical glass having a refractive index nd of 1.815 or more and an Abbe's number vd of 29 or less.
2. The optical glass of claim 1, which has a glass transition temperature of less than 530° C.
3. The optical glass of claim 1, which has a liquidus temperature of 1,080° C. or lower.
4. The optical glass of claim 1, which has an $Si^{4+}$ content of 15 to 30%.
5. The optical glass of claim 1, which has a $B^{3+}$ content of 15% or less.
6. The optical glass of claim 1, which has an $Nb^{5+}$ content of 10 to 30%.
7. The optical glass of claim 1, which has a $Ti^{4+}$ content of 0 to 15%.
8. The optical glass of claim 1, which has a $W^{6+}$ content of 0 to 4%.
9. The optical glass of claim 1, which has a $Zr^{4+}$ content of 0 to 4%.
10. The optical glass of claim 1, which has a $Zn^{2+}$ content of 9% or less.
11. The optical glass of claim 1, which has a $Ba^{2+}$ content of 6% or less.
12. The optical glass of claim 1, which has an $Sr^{2+}$ content of 2% or less.
13. The optical glass of claim 1, which has a $Ca^{2+}$ content of 3% or less.
14. The optical glass of claim 1, which has an $Li^+$ content of 25% or less.
15. The optical glass of claim 1, which has an $Na^+$ content of 30% or less.
16. The optical glass of claim 1, which has a $K^+$ content of 25% or less.
17. The optical glass of claim 1, wherein the cationic ratio of the content of $Li^+$ to the total content of $Li^+$, $Na^+$ and $K^+$ is 0.1-1.
18. The optical glass of claim 1, which has a $\Delta Pg,F$ of 0.0130 or less.
19. An optical element formed of the optical glass recited in claim 1.
20. An image-sensing device having the optical element recited in claim 19.
21. A precision press-molding preform formed of the optical glass recited in claim 1.
22. A process for producing a precision press-molding preform, which comprises manufacturing the preform recited in claim 21 through the steps of heating and melting glass raw materials to prepare a molten glass and shaping said molten glass.
23. A process for producing an optical element, which comprises the steps of heating the precision press-molding preform recited in claim 21 and precision press-molding the preform with a press mold.

24. The process for producing an optical element as recited in claim 23, wherein the precision press-molding preform and the press mold are heated together and the preform is precision press-molded.

25. The process for producing an optical element as recited in claim 23, wherein the precision press-molding preform is heated and then introduced into the press mold that is preheated, and the preform is precision press-molded.

* * * * *